United States Patent [19]

Krufka

[11] Patent Number: 4,717,955
[45] Date of Patent: Jan. 5, 1988

[54] RAM INTERFACE CONTROL CIRCUIT

[75] Inventor: Frank S. Krufka, Mount Joy, Pa.

[73] Assignee: RCA Corporation, Princeton, N.J.

[21] Appl. No.: 33,124

[22] Filed: Mar. 31, 1987

[51] Int. Cl.[4] ............................................. N04N 7/18
[52] U.S. Cl. .................................. 358/107; 358/101; 358/903; 356/384
[58] Field of Search ................ 358/107, 101, 93, 106, 358/903; 364/563; 356/384

[56] References Cited

U.S. PATENT DOCUMENTS

| | | | |
|---|---|---|---|
| 4,480,264 | 10/1984 | Duschl | 358/107 X |
| 4,498,779 | 2/1985 | Southgate et al. | 356/384 |
| 4,525,735 | 6/1985 | Krufka | 358/10 |
| 4,533,251 | 8/1985 | French et al. | 356/384 |
| 4,556,902 | 12/1985 | Krufka | 358/107 |
| 4,665,429 | 5/1987 | Krufka | 358/107 |

Primary Examiner—James J. Groody
Assistant Examiner—Victor R. Kostak
Attorney, Agent, or Firm—E. M. Whitacre; D. H. Irlbeck; T. H. Magee

[57] ABSTRACT

A RAM (Random Access Memory) interface control circuit is used for measuring spaces in a periodic matrix by controlling a RAM memory circuit coupled between a photodetector array interface circuit and a computer. A plurality of light sources simultaneously illuminate the matrix with light at a plurality of discrete locations. A plurality of linear photodiode arrays simultaneously receive the respective light/shadow images from the matrix at the discrete locations, and associated control and quantizer circuits produce signals representative of the spaces and areas therebetween. RETICON interface circuits are coupled, respectively, to the control and quantizer circuits for simultaneously converting the signals for each location into data values and transmitting the data values in parallel to respective RAMs. RAM interface control circuits are coupled, respectively, to the RAMs for sequentially addressing the respective RAMs for seriatim transfer of the data values to the computer.

20 Claims, 16 Drawing Figures

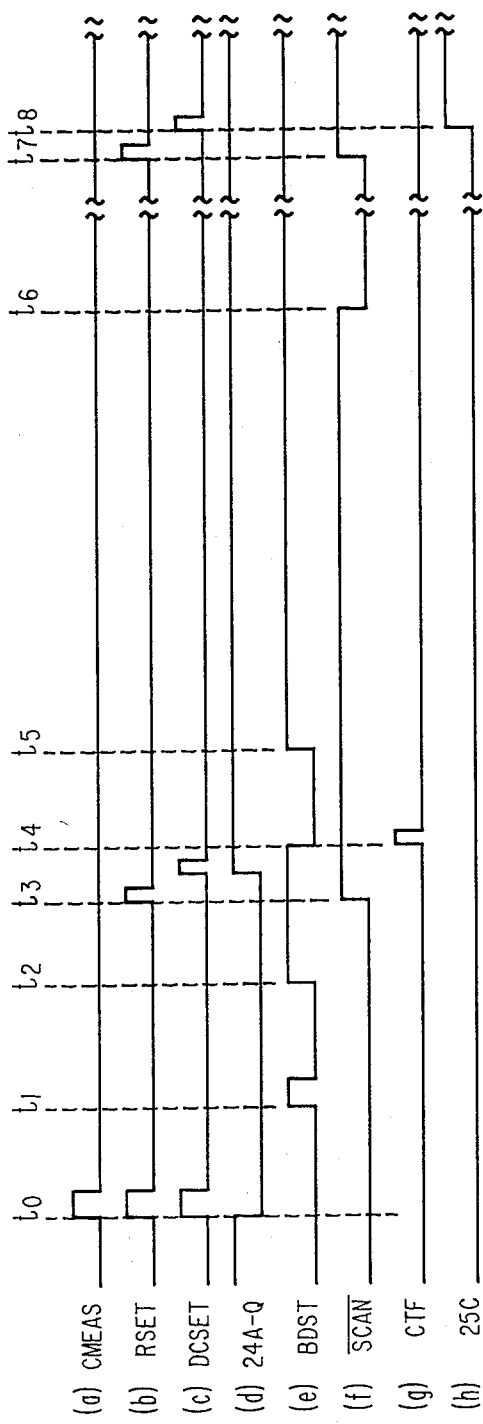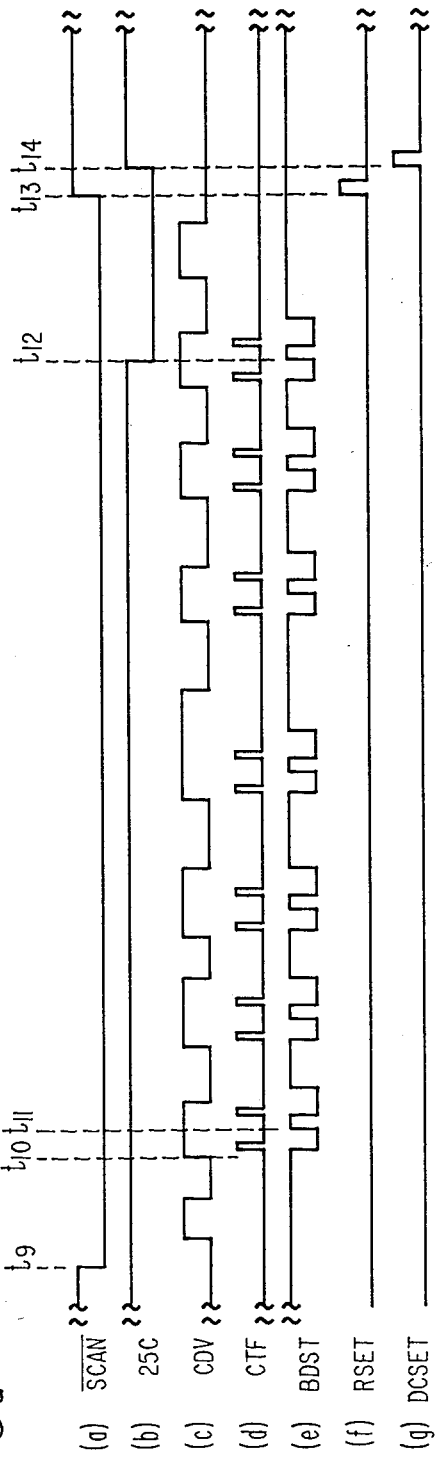
Fig. 6a
Fig. 6b

RAM INTERFACE CONTROL CIRCUIT

BACKGROUND OF THE INVENTION

This invention pertains generally to a system for measuring line or dot spaces in a periodic matrix on a surface and, particularly, to a system for measuring space width or dot diameter on a cathode-ray tube faceplate panel.

During production of cathode-ray tubes for color television receivers, a black matrix is applied to the inside surface of the faceplate panels. The black matrix consists of parallel lines which extend vertically as defined by the viewing orientation of a conventional tube. Black lines are spaced at desired intervals leaving transparent glass in the spaces between the matrix lines. With a high-resolution display tube, the black matrix is applied with transparent dot spaces in the matrix. The transparent spaces are coated with slurries of materials containing phosphors which emit the three primary colors of light, i.e., red, green and blue, when impacted by electrons. The three phosphors are alternately applied in a repetitive sequence such as red, green and blue to all the transparent spaces of the panel. Prior to the application of the phosphors, it is desirable to measure the space widths formed by the transparent spaces on standard panels and measure the transparent dot diameters on high-resolution display panels to verify that they are within acceptable dimensional tolerances in order to avoid the expensive application of phosphors to improperly matrixed faceplate panels.

In order to measure the dot diameters and space widths of each panel, the faceplate panel is placed between a stationary light source and a detector. Light is passed through the spaces within the matrix to form an image on the light detector. This image is scanned in a direction substantially perpendicular to the matrix lines, and the variation in light caused by the opaque areas and the transparent spaces is sensed by the detector and provided to a measuring system. The panel is moved to various positions and the scanning and measuring repeated.

A system for carrying out the above operation is shown in U.S. Pat. No. 4,525,735. A problem with such a system is that the panel movement takes a relatively long time. This lowers the production rate to a point where it may be impossible to meet a particular desired inspection time, e.g., 15 seconds per panel. Another problem with this system is that invalid readings can be processed, which can result in the acceptance of an out-of-tolerance panel. Yet another problem is that the correct readings are fixed by the circuitry. Thus, different types of panels or shadow mask screens, e.g., normal resolution for regular television or high resolution for data display terminals, cannot be inspected by the same system.

SUMMARY OF THE INVENTION

A RAM (Random Access Memory) interface control circuit is used for measuring spaces in a periodic matrix by controlling a RAM memory circuit coupled between a photodetector array interface circuit and a computer. A plurality of light sources simultaneously illuminate the matrix with light at a plurality of discrete locations. A plurality of linear photodiode arrays simultaneously receive the respective light/shadow images from the matrix at the discrete locations, and associated control and quantizer circuits produce signals representative of the spaces and areas therebetween. RETICON interface circuits are coupled, respectively, to the control and quantizer circuits for simultaneously converting the signals for each location into data values and transmitting the data values in parallel to respective RAMs. RAM interface control circuits are coupled, respectively, to the RAMs for sequentially addressing the respective RAMs for seriatim transfer of the data values to the computer.

BRIEF DESCRIPTION OF THE DRAWING

FIGS. 6a, 6b, 6c and 6d are time sequence graphs showing a logic sequence for various signals transmitted by the RETICON INTERFACE circuit of FIGS. 5a, 5b and 5c.

DETAILED DESCRIPTION OF THE PREFERRED EMBODIMENT

Figure 1:
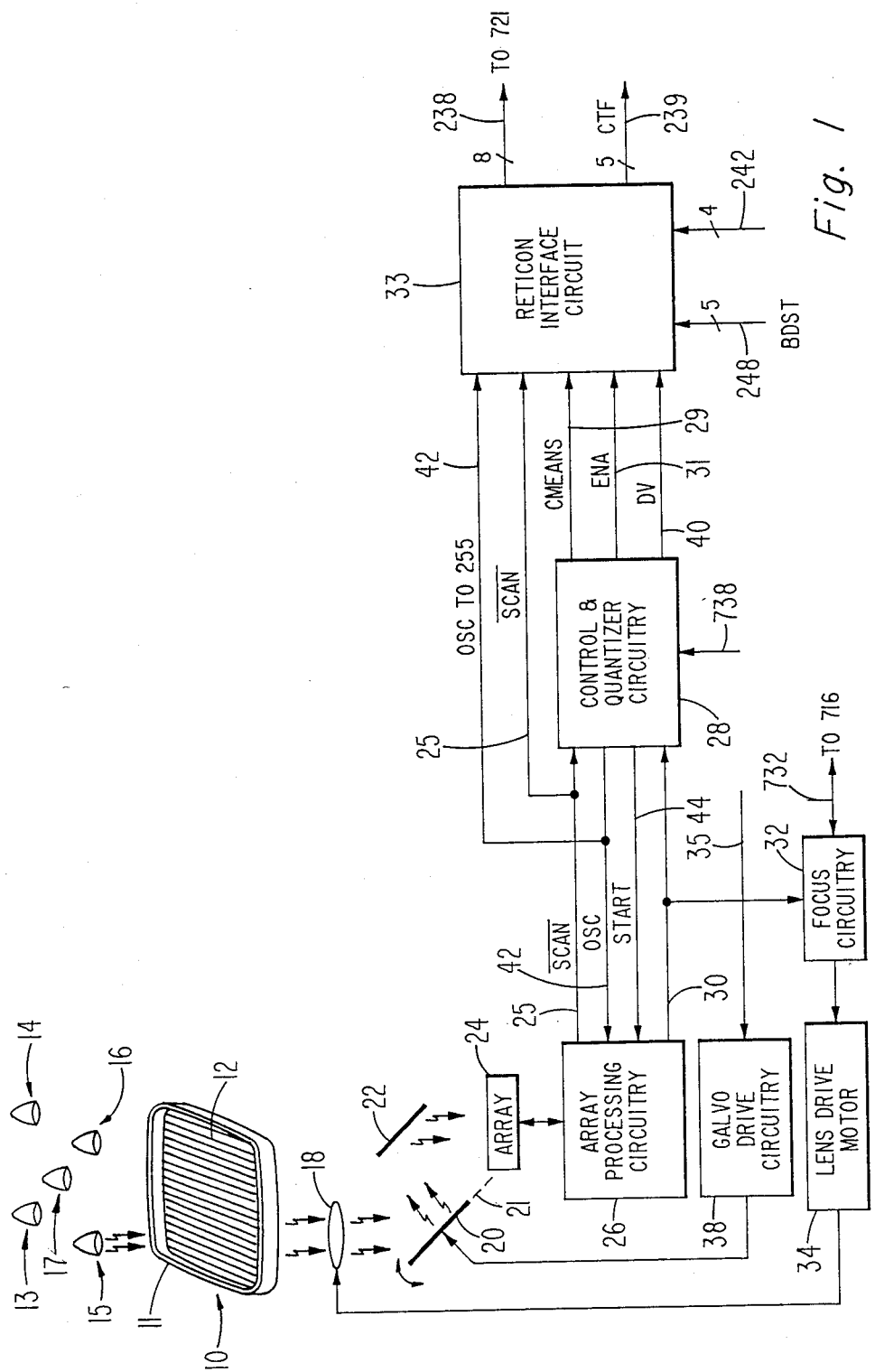
FIG. 1 is a diagrammatic view of a portion of a preferred embodiment for a multiple array panel matrix measurement system.

FIG. 1 of the drawing shows a stationary faceplate panel 10 which is oriented with its seal end 11 up and has a striped matrix 12 that extends into and out of the plane of FIG. 1. Alternatively, a dot matrix panel can be used with the present system. In order to achieve the desired inspection time, the panel 10 is illuminated by five stationary light sources or irradiating means located, respectively, at the four corners of the panel 10 and the center thereof. These locations are called camera positions 0 to 4, respectively. In FIG. 1, two corner sources 13 and 14 are directly behind the sources 15 and 16. A center source 17 is between and behind sources 13 and 14.

Since the camera circuitry is identical for all five camera positions, only the circuitry associated with the source 15 is shown and described. Light from the source 15 passes through the transparent spaces of the panel 10 to a focusing lens 18 in a camera which focuses the light onto a rotatable mirror 20 as a light/shadow image of that area of the panel 10. It is reflected by the mirror 20 to a stationary mirror 22 and then towards a receiving means or linear photodiode array 24 disposed in the camera. The photodiode array 24 can be an H-series model 1728 photodiode array manufactured by EG&G Reticon and, as such, has 1728 pixels (light-detecting diodes) which are individually responsive to light energy. After the photodiode array 24 scans the first line across the reflected image, the mirror 20 is then rotated slightly about an axis which is parallel to the plane of the paper, shown as dotted line 21, and another line is scanned across the array 24. This action continues until a large number of lines, such as two hundred, have been scanned across the photodiode array 24.

Figure 3:
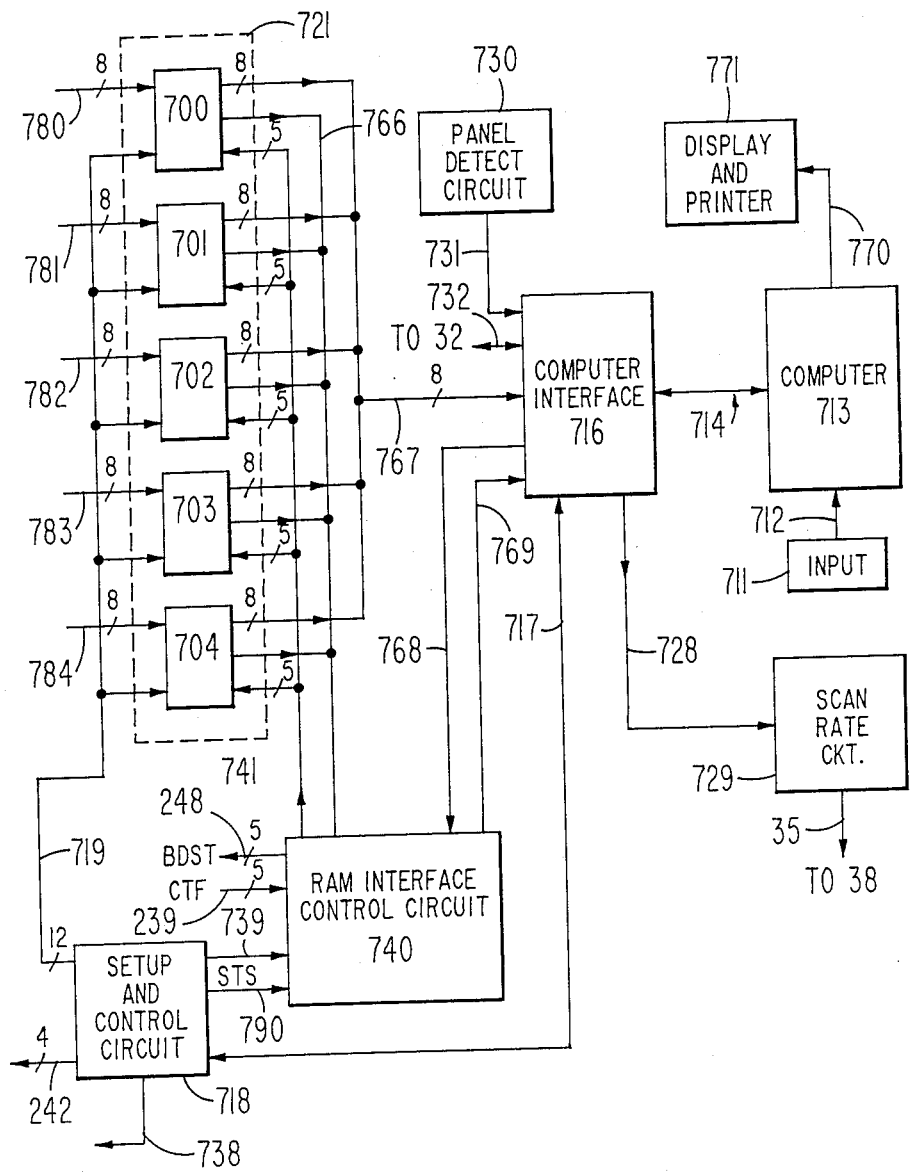
FIG. 3 is a block diagram showing the remaining portions of the multiple array panel matrix measurement system of FIG. 1.

Scanning in a direction transverse to the matrix lines is done by an ARRAY PROCESSING circuit 26 which sequentially reads out each of the 1728 diodes of the array 24 under the control of a pixel oscillator signal (OSC) on line 42 and START signal on line 44 from a CONTROL AND QUANTIZER circuit 28. As a result, an analog video signal is produced at an output 30 of the circut 26 that is HIGH during an opaque area and LOW during a transparent space. This analog video signal is applied to a known-in-the-art FOCUS circuit 32, which in turn controls a lens drive motor 34. The motor 34 controls the spacing of the lens 18 from the panel 10 to provide fine focusing. The other input to the focus circuit 32 is a start focus signal from a computer interface system 716 (FIG. 3). This signal line initiates the focus. The OSC signal line 42 of the CONTROL AND QUANTIZER circuit 28 also goes to a RETICON INTERFACE circuit 33.

A scan rate circuit (described below) provides a signal on a line 35 which is amplified by a GALVO (galvonometer) DRIVE circuit 38 that controls a galvonometer (not shown), which in turn rotates the mirror 20 to provide scanning in a direction perpendicular to the scan direction provided by the array 24. The scan rate, as determined by the signal on line 35, is such that non-overlapping scan lines are used with a line matrix and overlapping scan lines are used with a dot matrix. The latter ensures that at least one scan goes through the centers of the dots, i.e., it measures the diameters thereof. Typically 200 scaning lines are used for each camera to ensure scanning from the center of one row of dots to the center of the adjacent row. For simplicity, the same number of scanning lines are used for the line matrix tube.

The analog video signal at output 30 is also applied to the CONTROL AND QUANTIZER circuit 28 having a threshold of 50 percent of the difference between the HIGH and LOW states. Thus, the digital video signal (DV) output pulses (line f of FIG. 6d) of circuit 28 on a line 40 now have sharp edges with the pulse widths representing the opaque area widths. The CONTROL AND QUANTIZER circuit 28 also provides a CMEAS signal on line 29 and an ENA (enable) signal on line 31, which are triggered by a computer via a SETUP AND CONTROL circuit 718 (FIG. 3) output on line 738. The array processing circuit 26 provides a $\overline{SCAN}$ signal on line 25, which is LOW when the output of the linear photodiode array 24 is being scanned (read out).

It is desired to measure two of every transparent line or dot space that will be assigned to the same color when the phosphors are later added. Since there are three colors altogether, this makes six readings. In addition, it is desired to measure the widths of the opaque lines adjacent the transparent lines. This adds another six readings. Still further, the first opaque line reading and first transparent line reading are ignored since they may be in error due to skewing of the panel 10 in the apparatus. Thus a total of 14 opaque and transparent line readings per scan normally are used. However, in the present system, up to 16 such readings or values can be used. The same number is used for a dot matrix tube with the exception that only the transparent dot spaces are measured.

Figure 2:
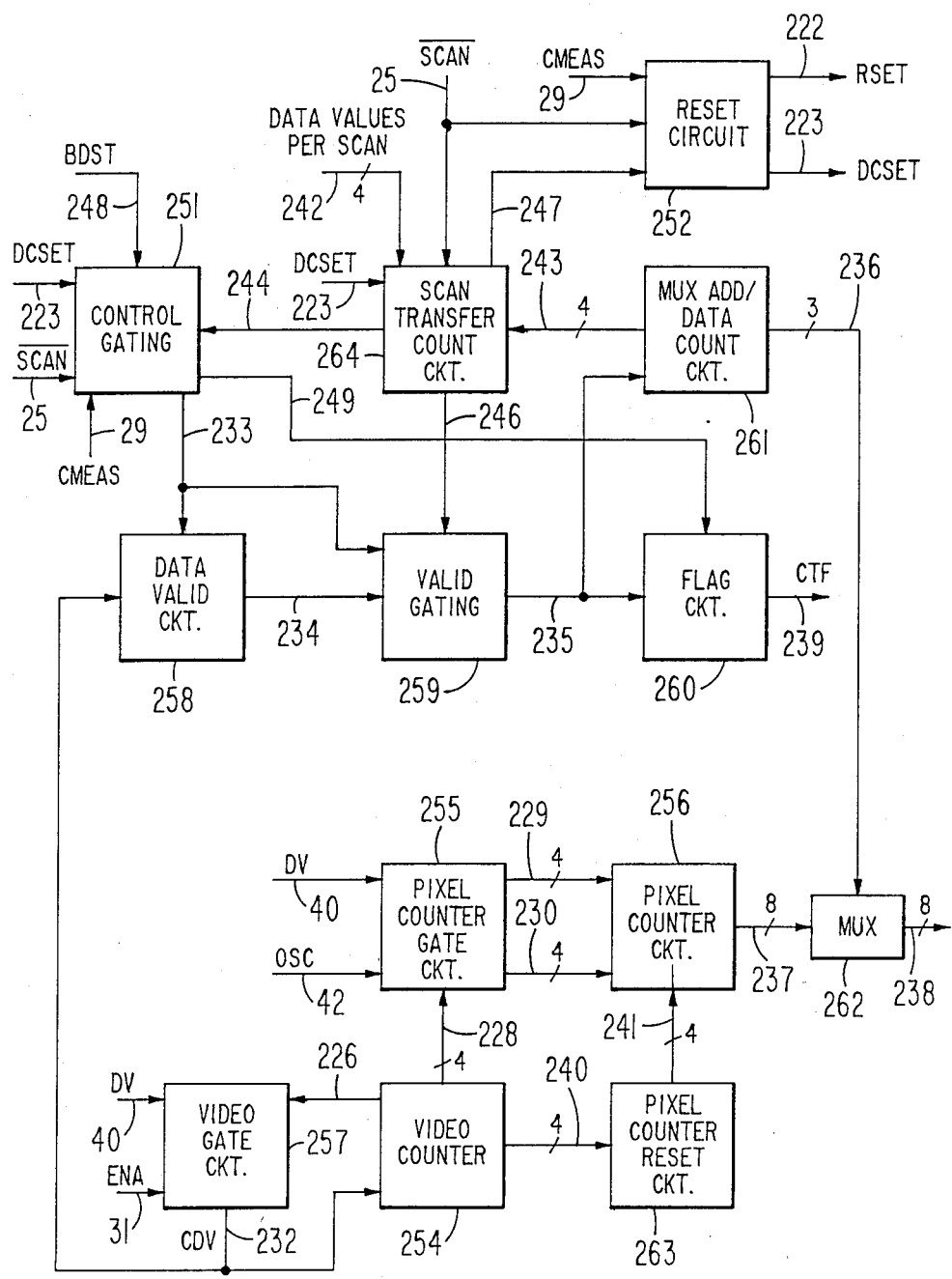
FIG. 2 is a block diagram of a RETICON INTERFACE circuit which can be used in the system of FIG. 1.

FIG. 2 shows a block diagram of the camera RETICON INTERFACE circuit 33, there being five such circuits, one for each camera. A reset circuit 252 comprises timing flip-flops and AND gates, and receives the CMEAS signal which starts the system and the $\overline{SCAN}$ signal. The reset circuit 252 provides two reset signals, RSET and DCSET, to the circuit of FIG. 2 to initialize it and to reset the circuit of FIG. 2 after every scan of the camera.

Figure 5A:
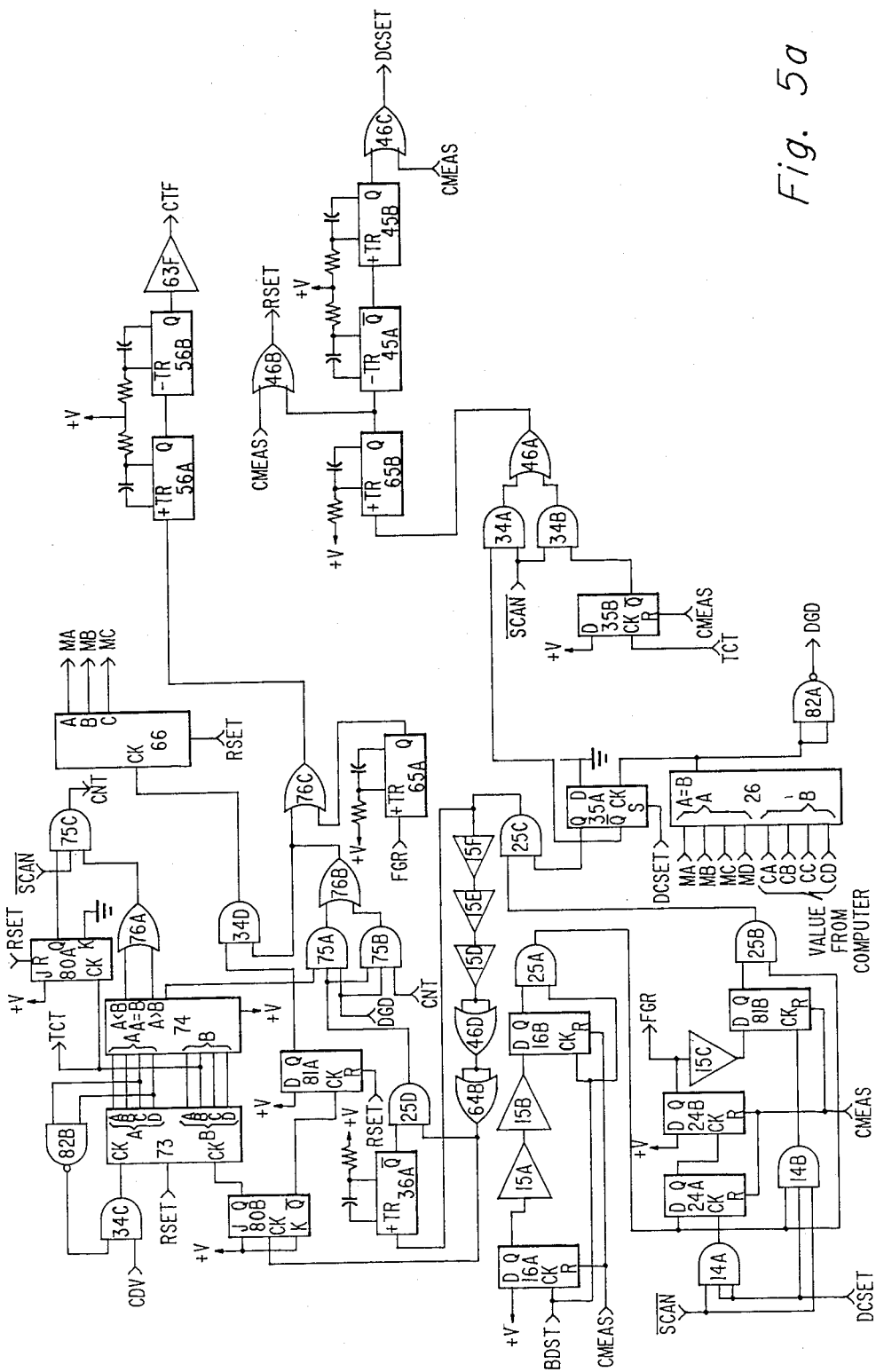
FIGS. 5a, 5b and 5c are schematic diagrams of a RETICON INTERFACE circuit which can be used in the system of FIG. 1.
Figure 5B:
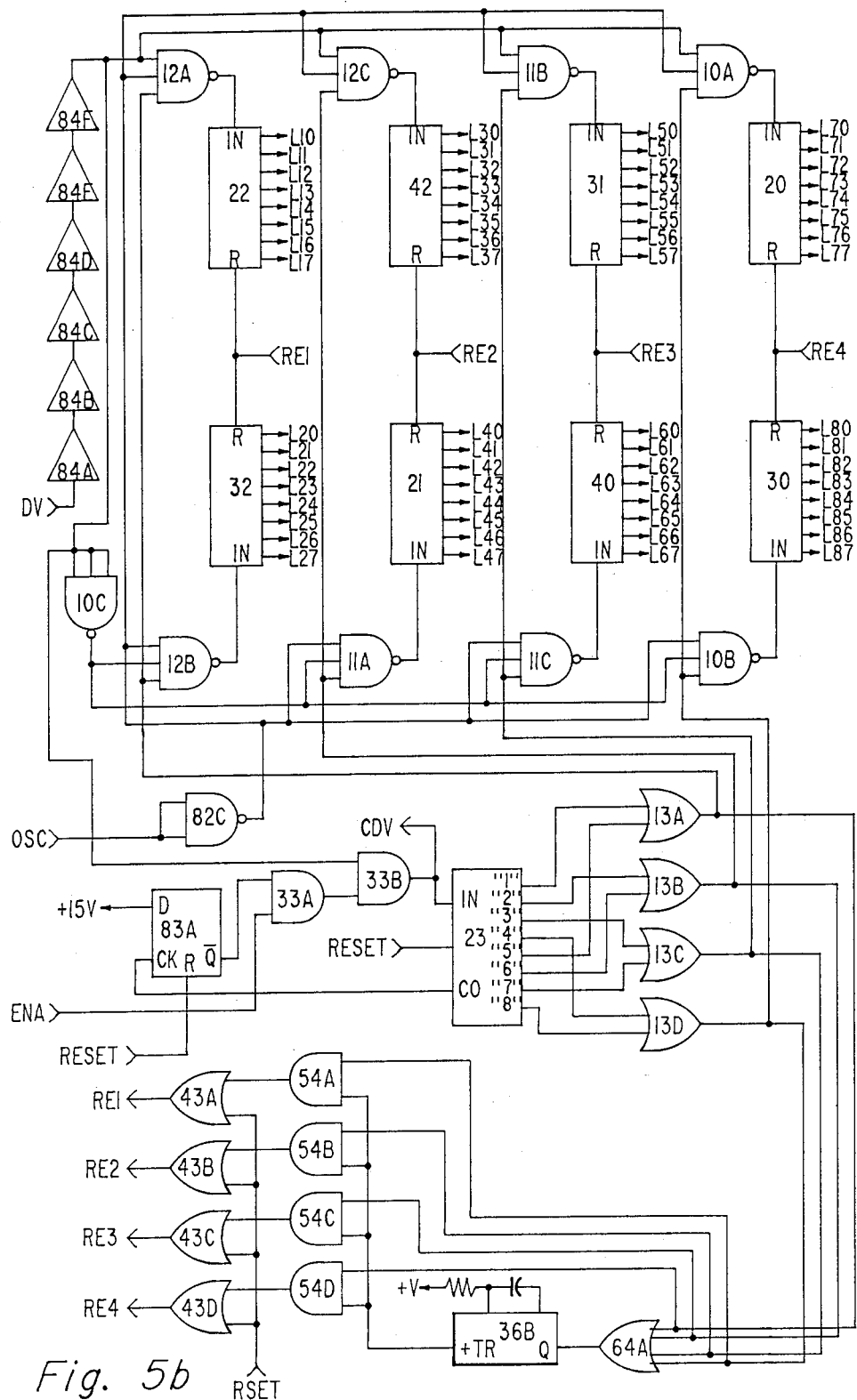

The digital video signal DV on the line 40 and the pixel oscillator signal OSC on the line 42, both from the CONTROL AND QUANTIZER circuit 28 of FIG. 1, are applied to a pixel counter gating circuit 255 comprising eight 3-input AND gates (shown in FIG. 5b). The pixel oscillator signal OSC on line 42 comprises a pulse train, the number of pulses indicating the widths of the opaque areas and the line or dot spaces. The signals on four select lines 228, from a video counter circuit 254, and the DV signal select which of the output lines 229 or 230 from the pixel counter gating circuit 255 applies signals to the input of a pixel counter circuit 256. The pixel counter circuit 256 comprises eight counters (shown in FIG. 5b). Four counters store pixel counts that occur during light or transparent spaces of the panel (light counters) and are respectively coupled to the four wires of line 230, and four counters store pixel counts occuring during dark or opaque areas (dark counters) and are respectively coupled to the four wires of line 229. These counters are called light counters 1–4 and dark counters 1–4, respectively. For example, when the CMEAS signal from circuit 28 of FIG. 1 has occurred and the enable (ENA) signal on a line 231 goes high, which occurs when valid data is being read out of the linear array 24, the digital video DV signal from the linear photodiode array 24 is being provided. During this time, the digital video DV signal occurs with a pixel count which is gated to the dark counter 1 and the light counter 1 of the circuit 256. Thus, the dark counter 1 counts the pixels corresponding to the first dark area (DV HIGH), and then the light counter 1 counts the pixels corresponding to the first light area (DV LOW). When the second DV signal occurs (DV goes HIGH again), the dark counter 2 and the light counter 2 are enabled to count.

A video gate circuit 257 comprises a pair of AND gates (shown in FIG. 5b) for receiving the ENA and DV signals. The circuit 257 provides a delayed digital video signal (CDV) at output 232, the signal being slightly delayed from the DV signal. This CDV signal is applied to the video counter circuit 254 and a data valid circuit 258 comprising mainly digital comparators (shown in FIG. 5a). The data valid circuit 258 ensures that the digital video count is ahead of a BDST (data strobe) signal count (explained below) on line 233. The data valid circuit 258 functions such that two BDST pulses equate to one CDV pulse. The circuit 258 thus ensures that the data in the pixel counters of the circuit 256 is valid, i.e., a pair of dark and light counters are filled before they are read into a RAM MEMORY circuit 721 (FIG. 3).

For example, when the DV signal goes HIGH a second time representing the next dark area imaged on the linear photodidoe array 24, the video counter circuit 254 selects the dark counter 2 and the light counter 2 of pixel counter circuit 256 via the output lines 229 and 230, respectively, of the pixel counter gating circuit 255. At this time, the data in the dark counter 1 and the light counter 1 is valid.

A control gating circuit 251 receives the BDST signal from a RAM INTERFACE CONTROL circuit 740 (FIG. 3) on input line 248. A valid output signal of the data valid circuit 258 on a line 234 enables a valid gating circuit 259, comprising flip-flops and gates (shown in FIG. 5a), to gate the BDST signal from the control gating circuit 251 on line 233 over a line 235 to a flag circuit 260 comprising a pair of cascaded one shots (shown in FIG. 5a) and a MUX (multiplexer) address/data count circuit 261 comprising a counter (shown in FIG. 5a). A three-line address signal on a line 236 is applied to a MUX circuit 262. The first address is a binary count of zero which puts the contents of the dark counter 1 on lines 237 to the output data bus line 238. The flag circuit 260 causes a delay to allow the data to settle and then generates a CTF signal on a line 239 to the RAM INTERFACE CONTROL circuit 740 (FIG. 3) which puts the BDST line LOW (explained below), and the data is then read off the bus 238 into the RAM MEMORY circuit 721 (FIG. 3).

The next BDST occurs a short time later causing the MUX address circuit 261 to increment the MUX address signal on line 236, thereby putting the contents of the light counter 1 on the data bus lines 238, after which a CTF signal is generated on the line 239. The data in the dark counter 2 and the light counter 2 will not be read until the dark counter 3 and the light counter 3 have begun to count, since the data valid circuit 258 will not enable the valid gating circuit 259 until this has happened.

Only four pairs of counters are used in the pixel counter circuit 256, but many more values can be read by rolling through the pixel counters, which is explained as follows. All counters are zero at initializing (reset). When data is to be read, data is read first into the dark and light counters 1, via the pixel counter gating circuit 255 utilizing the select lines 228 of the video counter circuit 254. The output of the video counter circuit 254 also provides four reset select lines 240 to a pixel counter reset circuit 263 mainly comprising four AND gates driving four OR gates (shown in FIG. 5a). The pixel counter reset circuit 263 selectively resets the counters of the pixel counter circuit 256 by way of the lines 241.

Thus, data is read into the dark and light counters 1, at which time the dark and light counters 3 are reset by a signal on line 241. When data is read into the counters 2, the counters 4 are reset while data is read out of the counters 1. When data is read into the counters 3, the counters 1 are reset while data is read out of the counters 2. When data is read into the counters 4, the counters 2 are reset while data is read out of the counters 3. When data is again read into the counters 1, the counters 3 are reset and data is read out of the counters 4. This rolling process continues until the number of desired values is read during a scan.

The video counter circuit 254 limits the number of data values that can be read to sixteen, i.e., eight dark values and eight light values. When the video counter circuit 254 detects the ninth dark DV pulse, an output line 226 to the video gate circuit 257 provides a signal which prevents any further pixel counting.

The number of data values read per scan is adjustable and is controlled by the computer or control device. This is done by way of a 4-bit binary input line 242 to a scan transfer count circuit 264 mainly comprising a digital comparator (shown in FIG. 5a). For example, if 14 values read per scan are desired, a binary count of 13 is applied (0–13, total of 14) on the line 242 to the scan transfer count circuit 264. Another 4-bit binary number on line 243 is applied to the scan transfer count circuit 264 from the MUX address circuit 261. The line 243 provides a signal representating the data transfers that occurred during the scan. Thus, when the MUX circuit 261 provides a count of 13 on line 243, 14 values have been read off the data bus 238 for a single scan. A line 244 from the scan transfer count circuit 264 then provides a signal to the control gating circuit 251, preventing any further BDST signals being gated through the circuit 251.

In the event that 14 data values were not read and the $\overline{\text{SCAN}}$ signal goes HIGH on the line 25 indicating the scan is complete, the output signal on a line 246 of the scan transfer count circuit 264 enables the valid gating circuit 259. This bypasses the data valid circuit 258 and allows the BDST signals on the line 233 to be gated to the circuits 260 and 261. When 14 transfers are complete, a signal on the line 244 from the scan transfer count circuit 264 disables the control gating circuit 251, as explained above, and the line 246 changes back to the normal state to allow the data valid circuit 258 to control the BDST valid gating circuit 259 for the next scan.

The $\overline{\text{SCAN}}$ signal on the line 25 is applied to the reset circuit 252 to produce RSET (reset) signals between scans. A signal on an output line 247 from the scan transfer count circuit 264 prevents this from occurring until the specified number of values (in this case 14) has occurred.

When the RSET and DCSET signals occur, the circuitry is ready for the next scan of the photodiode array 24. The BDST signal on the input line 248 is gated to the data valid circuit 258, and all counters and counting circuits are reset to zero and ready for the next scan. When all transfers are complete, the BDST signal stops occurring and all scans are complete.

The control gating circuit 251, comprising flip-flops and gates (shown in FIG. 5a), provides the correct handshaking for initialization of data transfer and for correct timing to prevent data being taken initially from the middle of the first scan. The first BDST signal from the RAM INTERFACE CONTROL circuit 740 (FIG. 3) is a pulse that addresses the RETICON INTERFACE circuit 33 and requires no handshake. The second BDST signal from the RAM INTERFACE CONTROL circuit 740 requires a handshake, and the handshake is used only to signal to the RAM INTERFACE CONTROL circuit 740 that the RETICON INTERFACE circuit 33 of FIG. 2 and the RAM INTERFACE CONTROL circuit 740 of FIG. 3 are ready to transfer data. No data is transferred on the first or second BDST pulse.

The control gating circuit 251 latches the first BDST pulse and prohibits passing a signal to the output line 233. The second BDST signal is provided via an input line 249 to the flag circuit 260 in response.

When the third BDST signal occurs, which is the first data request, the control gating circuit 251 prevents passing a signal to the output line 233 until $\overline{\text{SCAN}}$ goes HIGH, indicating the end of an array readout. This ensures that the BDST signal is applied to the output line 233 between scans, and data (first scan) is read from the beginning of the next scan.

FIG. 3, in general, shows a RAM MEMORY circuit 721 for storing the pixel data values, a computer interface system 716, a computer 713, a RAM INTERFACE CONTROL circuit 740, as well as other various control circuits described below. An input circuit 711 is used to manually provide information to the computer 713 as to the number of data values per scan, the number of scans per reading, and the panel type (dot or line screen panel) over line 712. The computer 713 can be model HP 9920 manufactured by Hewlett-Packard. The computer 713 transmits this information over bus line 714 to the computer interface system 716, which is model HP 6940B manufactured by Hewlett-Packard. The interface system 716 provides the proper timing and addressing to interface the computer 713 with the various electronic circuits of the present system.

The interface system 716 transmits the information via a line 717 to a SETUP AND CONTROL circuit 718. The output signal from the circuit 718 on a line 719 is a 12-bit binary number applied to the RAM MEMORY circuit 721. This number correlates to the total number of data values per camera to be read. For example, if 200 scans per camera with 14 values per scan are desired, then the total number of data values per camera is (14)(200)=2800. With these conditions, the maximum value of the 12-bit binary number on the line 719 would be 2799 (0-2799, a total of 2800).

The output signal from the circuit 718 on the line 242 is applied to the five separate RETICON INTERFACE circuits 33, one of which is shown in FIG. 2. This signal is a 4-bit binary number which is applied to each of the RETICON INTERFACE circuits 33, and represents the number of data values per scan. For example, if 14 data values per scan are desired, then a binary 7 is latched on the line 242 (values are sent in even numbers, each binary 1 representing two data values, one "light" and one "dark" value).

Scan rate information is transmitted via a line 728 to a SCAN RATE circuit 729. This sets up both the total distance the galvo should scan and the distance between scans.

When a panel is in place and ready to be measured, a PANEL DETECT circuit 730, such as a weight sensitive switch, provides a signal via a line 731 to the computer interface system 716, which in turn signals the computer 713 via the bus line 714 that a panel is in place. The computer 713 initiates a signal via the computer interface system 716 on a line 732 to the five FOCUS circuits 32 (one shown in FIG. 1). In turn, the FOCUS circuits 32, respectively, provide signals to the five lens drive motors 34. The lens drive motors 34 drive the camera lenses 18 to focus the images on the linear arrays 24. The analog video signal at the output 30 is also applied to the FOCUS circuits 32.

Each of the five cameras has an identical FOCUS circuit 32 that operates independently of one another. When a camera is in focus, the FOCUS circuit 32 stops the associated lens drive motor 34. When all five cameras are focused, the FOCUS circuits 32 provide camera ready signals on the lines 732 to the computer 713 via the computer interface system 716.

The SCAN RATE circuit 729 then provides a signal to the GALVO DRIVE circuits 38 (FIG. 1) via line 35. The GALVO DRIVE circuits 38 provide signals to drive the camera galvos. The SCAN RATE circuit 729 comprises a digital-to-analog converter controlling a sawtooth generator that provides a single sawtooth signal.

The computer 713 then initializes a reading by addressing the SETUP AND CONTROL circuit 718 on the line 717 via the computer interface system 716. The control circuit 718 then applies a CMEAS signal on a line 738 to the control and quantizer circuit 28 and also a reset signal (RST) on line 739. The reset signal (RST) on the line 739 and a start signal (STS) on a line 790 are applied to the RAM (Random Access Memory) INTERFACE CONTROL circuit 740.

The RAM INTERFACE CONTROL circuit 740 (FIG. 3) applies a number of signals on a bus line 741 to the RAM MEMORY circuit 721. The RAM MEMORY circuit 721 comprises five RAM sections 700 to 704 for receiving on 8-bit lines 780 to 784, respectively, the output signals of the RETICON INTERFACE circuits 33 at positions 0 to 4, which are the respective lines 238 (FIG. 2) of each of the five RETICON INTERFACE circuits 33. Each RAM section 700-704 of the RAM MEMORY circuit 721 receives four control signals of the same function, but independent for each of the four RAM sections 700-704. Only the signals applied to the RAM section 700 will be described.

A JAM signal on one of the lines of the bus line 741 causes the RAM section 700 to be set up at the initial address determined by the binary value on the line 719. The CMEAS signal on the line 738 from the SETUP AND CONTROL circuit 718 resets each of the CONTROL AND QUANTIZER circuits 28.

The RETICON INTERFACE circuit 33 provides an 8-bit binary number representing the number of pixels from each light and dark area on the line 238 to the RAM section 700 (which is the 8-bit line 780 in FIG. 3), as previously described. The data readout from line 238 of the RETICON INTERFACE circuit 33 of FIG. 2 to the RAM memory circuit 721 of FIG. 3 is controlled by the RAM INTERFACE CONTROL circuit 740 of FIG. 3. The circuit 740 outputs a BDST$\phi$ signal, as previously described, on line 248 to the RETICON INTERFACE circuit 33 of FIG. 2. The RETICON INTERFACE circuit 33 generates a CTF signal on line 239 to the RAM INTERFACE CONTROL circuit 740, indicating data is ready on the 8-bit line 780 to RAM section 700.

The RAM INTERFACE CONTROL circuit 740 generates WRT$\phi$ and BRD$\phi$ signals on bus line 741 to the RAM section 700, which causes the data on line 780 to be read into the RAM section 700. The circuit 740 then generates a DEC$\phi$ signal on bus line 741 to decrement the address of the RAM section 700, and then generates another BDST signal to the RETICON INTERFACE circuit 33 of FIG. 2. Thus, each pixel value is read into a different memory location of the RAM section 700.

When the desired number of data values have been read into the RAM section 700, a COUT$\phi$ signal on a line 766 from the RAM section 700 goes LOW and is applied to the input of the RAM INTERFACE CONTROL circuit 740. This stops data transfer into the RAM section 700. Simultaneously with the above-described operation, pixel values from the four remaining camera RETICON INTERFACE circuits 33 are, respectively, read into the RAM sections 701 to 704. Thus, the operation is done quickly. At this time, the RAM INTERFACE CONTROL circuit 740 outputs a DEC$\phi$ signal on line 741, which causes the RAM MEMORY circuit 721 to be at the initial starting address where data from the RETICON INTERFACE circuit 33 was first stored.

When all of the COUT signals have been received from the RAM sections 700 to 704, the data in the RAM MEMORY circuit 721 is read out to the computer interface system 716 and the computer 713 in a continuous string, thus also achieving speed. The data is provided on a bus line 767. First the RAM section 700, then the RAM section 701, etc., and finally the RAM section 704 are read out until all data values have been read by the computer 713.

The handshaking between the computer 713 and the RAM INTERFACE CONTROL circuit 740 occurs over a DST line 768 and a FLAG line 769. The RAM INTERFACE CONTROL circuit 740 applies a CMPUT$\phi$ signal on line 741 which puts the data values stored in the RAM memory circuit 721 from the RAM sections 701 to 704 onto the data bus line 767. The RAM INTERFACE CONTROL circuit 740 provides the proper addressing (DEC$\phi$ signal) such that the computer 713 reads one continuous string of data values. The data is an eight-bit binary number read into the computer 713 via the interface 716 on line 767 from the RAM MEMORY circuit 721. The computer 713 then processes the data values and provides the space width or dot diameter values via a line 770 to a printer/display 771.

The RETICON INTERFACE circuit 33 provides a plurality of 8-bit binary numbers that represent opaque areas and transparent spaces measured on the panel. The values from five cameras are stored in parallel to the RAM MEMORY circuit 721. The RAM INTERFACE CONTROL circuit 740 controls the handshaking between the RETICON INTERFACE circuit 33 and the RAM MEMORY circuit 721. The RAM INTERFACE CONTROL circuit 740 also provides the multiplexing of data from the RAM MEMORY circuit 721 to the computer 713 of FIG. 3.

Figure 4:
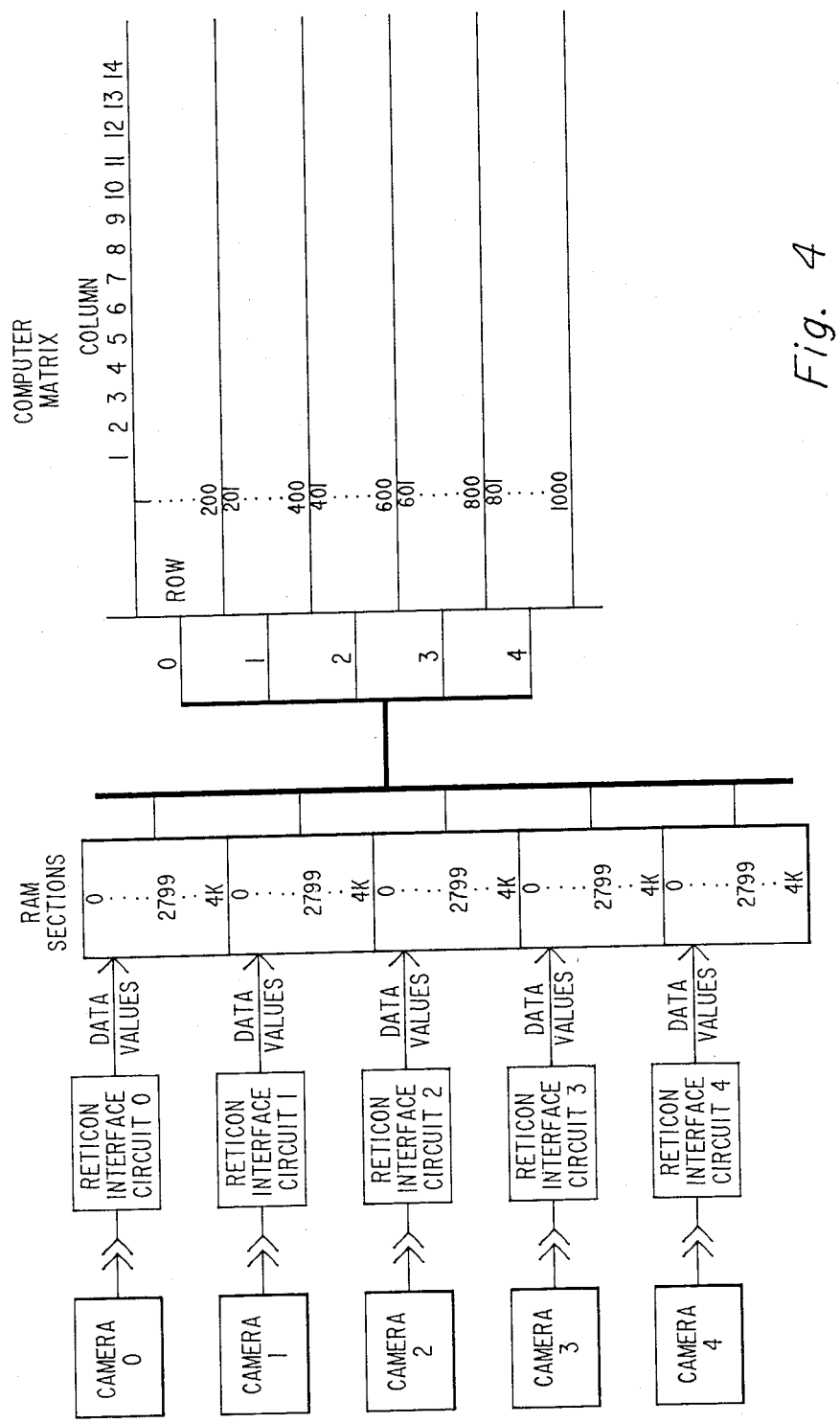
FIG. 4 is a block diagram showing how data values flow through the multiple array panel matrix measurement system of FIGS. 1 and 3.

FIG. 4 shows the principle of the system. Data from five cameras is read into five RAM sections of the RAM MEMORY circuit 721 in parallel via the five RETICON INTERFACE circuits 33. When all data is read into the five separate RAM sections, the data is transferred to the computer 713 and is stored in one matrix. This provides a simplified software technique to analyze data and calculate the various values.

Figure 5C:
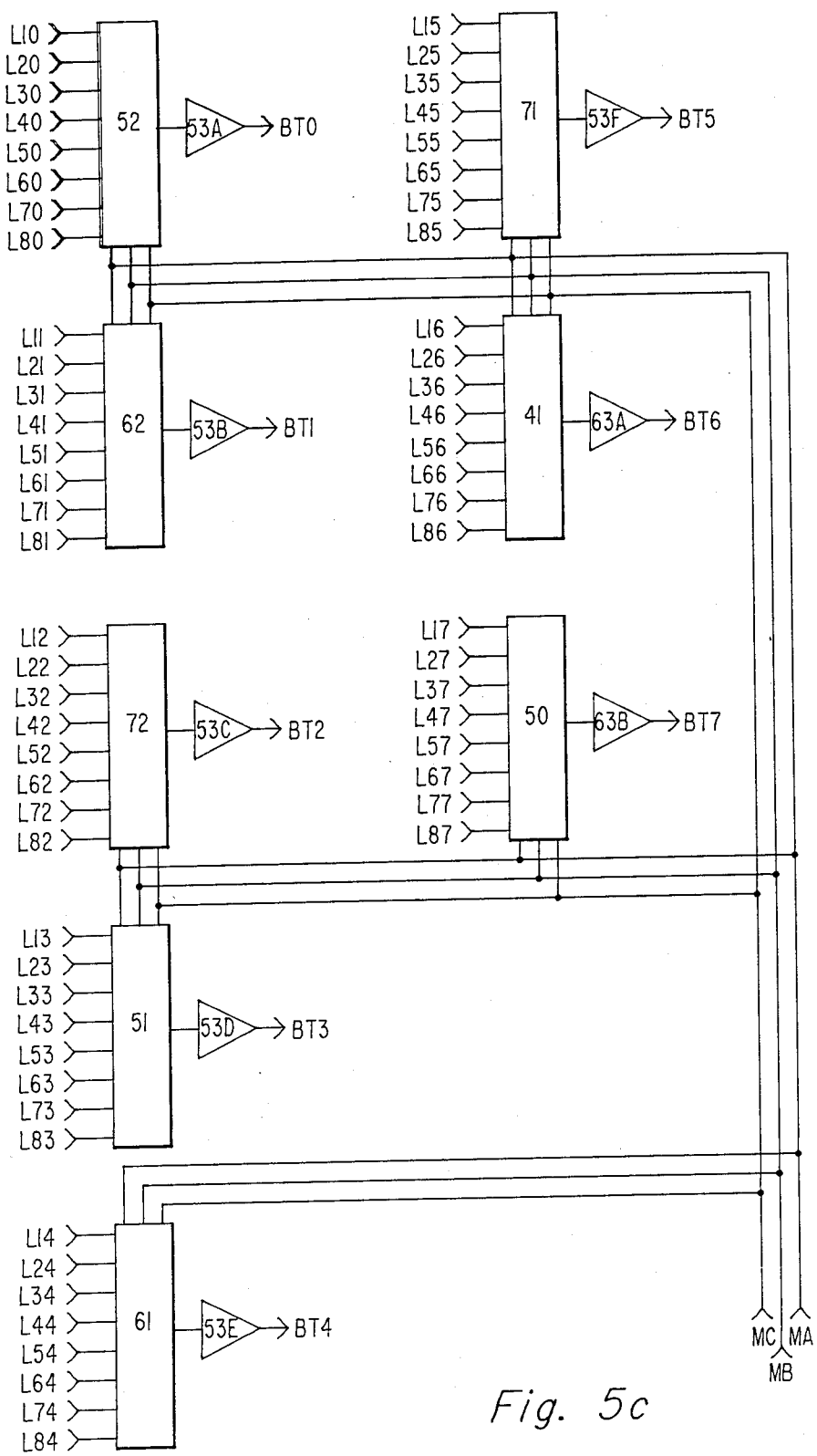

FIGS. 5a, 5b and 5c show a detailed schematic diagram of the RETICON INTERFACE circuit 33, which will be explained in conjunction with various system signals illustrated in the time sequence graphs of FIGS. 6a, 6b, 6c and 6d. Signals noted as CMEAS, BDST, etc. are common to all five RETICON INTERFACE circuits 33, whereas BDST$\phi$ is for RETICON INTERFACE circuit $\phi$, BDST1 is for circuit 1, BDST2 is for circuit 2, BDST3 is for circuit 3, and BDST4 is for circuit 4. In the following detailed description, only BDST$\phi$ is explained.

At time $t_o$ in FIG. 6a, the CMEAS signal (line a) is produced by the SETUP AND CONTROL circuit 718 of FIG. 3 on line 738 and transmitted to the five RETICON INTERFACE circuits 33, one of which is shown in FIG. 2. Since the five circuits 33 are identical, only one will be described in detail.

In FIG. 5a, the CMEAS signal (line a) is gated through OR gate 46B as a RSET signal (line b), and the CMEAS signal (line a) is also gated through OR gate 46C as a DCSET signal (line c). These signals initialize the present integrated circuits.

The RAM INTERFACE CONTROL circuit 740 of FIG. 3 produces a BDST signal pulse (line e) at time $t_1$. This first BDST pulse is used to address the RETICON INTERFACE circuit 33. This BDST signal at time $t_1$ clocks flip-flop 16A so that the Q output thereof goes HI. The Q output of 16A is delayed via gates 15A and 15B to the D input of flip-flop 16B. Thus, the delayed input prevents clocking of flip-flop 16B, and the Q output of flip-flop 16B remains LO.

At time $t_2$, the second BDST pulse occurs. This BDST signal clocks flip-flop 16B HI, which enables AND gate 25A. The BDST signal is then gated through AND gate 25A to the D input of flip-flop 24A, and to the inputs of AND gates 14B and 25B.

When an output of the RETICON photodiode array 24 is in progress, a $\overline{\text{SCAN}}$ signal (line f) is LO. When a readout is complete, $\overline{\text{SCAN}}$ goes HI to the inputs of AND gates 14A and 14B at time $t_3$. Approximately 5 microseconds after the leading edge of $\overline{\text{SCAN}}$, the DCSET signal (line c) goes HI for 2.5 microseconds. The leading edge of the DCSET signal (line c) is gated through AND gate 14A, which causes the Q output signal (line d) of flip-flop 24A to go HI.

The Q output signal (line d) of flip-flop 24A latches flip-flop 24B HI. The Q output signal of flip-flop 24B is applied to a delay gate 15C which keeps the D input to flip-flop 81B LO while the leading edge of the second BDST pulse occurs. This keeps flip-flop 81B from latching on the second BDST pulse.

The Q output of flip-flop 24B is also applied to a one-shot 65A which goes HI for 2.5 microseconds. This pulse is gated through an OR gate 76C which triggers a delay one-shot 56A HI for 2.5 microseconds. The falling edge of the output signal of one-shot 56A triggers the output of another one-shot 56B HI for 2.5 microseconds. This signal is gated through a buffer 63F, producing the CTF signal (line g) at time $t_4$. This CTF signal is a flag signal in response to the BDST signal from the RAM INTERFACE CONTROL circuit 740 of FIG. 3. The CTF signal (line g) causes the BDST signal (line e) to go LO, which initializes the RAM INTERFACE CONTROL circuit 740, preparing it to be ready for data transfer.

At time $t_5$, the third BDST signal then goes HI, which is the beginning location of the data. At this time $\overline{\text{SCAN}}$ is HI, which is a blanking period until time $t_6$ when the $\overline{\text{SCAN}}$ signal goes LO. At time $t_6$, an output of the photodiode array 24 begins. At time $t_7$, $\overline{\text{SCAN}}$ goes HI and, approximately 5 microseconds later, DCSET goes HI for 2.5 microseconds. This signal is gated through AND gate 14B which clocks the Q output of flip-flop 81B HI. The HI Q output of flip-flop 81B enables AND gate 25B, which now gates the BDST signal to the input of AND gate 25C at time $t_8$.

The other input to AND gate 25C is the Q output of flip-flop 35A. This signal is HI at this time since it was set by the DCSET signal. Thus, the BDST signal is gated through AND gate 25C. The output of AND gate 25C is applied to a series of delay gates and to the trigger input of one-shot 36A.

The positive edge of the third BDST pulse triggers one-shot 36A LO for 2.5 microseconds, and this output is applied to AND gate 25D. The other input to AND gate 25D is the delayed BDST signal. The output of AND gate 25D does not go HI until one-shot 36A times out and goes HI. This prevents AND gate 25D from going HI and enabling AND gate 75A until the delayed BDST signal has caused logic sequencing through IC's 80B, 73 and 74.

The output signal from the delay gates is also applied to JK flip-flop 80B. The positive edge of this signal triggers the Q output of flip-flop 80B HI and the $\overline{Q}$ output LO. The Q output of flip-flop 80B clocks the B channel input of a dual binary counter 73. The B channel output is now a binary 1 and is applied to a digital comparator 74. The other channel input of the digital comparator 74 is the A channel output of the dual binary counter 73.

The A channel input to the dual binary counter 73 is the CDV signal which is gated through an AND gate 34C. The CDV signal is a delayed digital video signal. The output of an NAND gate 82B is HI at this time, which enables AND gate 34C. The inputs to NAND gate 82B are the "8" and "4" count outputs from the A channel of the dual binary counter 73. Thus, if a count of 12 is reached by channel A of counter 73, the output of NAND gate 82B goes LO, disabling AND gate 34C. This prevents the A channel of the dual binary counter 73 from wrapping around in the event that an excessive number of CDV pulses occur during a scan.

FIG. 6b shows a time scale different from that of FIG. 6a. The $\overline{SCAN}$ signal in FIG. 6b (line a) is the same as the $\overline{SCAN}$ signal in FIG. 6a (line f) except that the time $t_6$ to $t_7$ in FIG. 6a equates to a time $t_9$ to $t_{14}$ in FIG. 6b, which is the output time of the array for one scan. At time $t_9$, the $\overline{SCAN}$ signal in FIG. 6b (line a) goes LO, and signals are read out of the linear photodiode array 24. When the first CDV signal (line c) occurs, the A channel output of the dual binary counter 73 reaches a count of 1. At this time the A>B output of the digital comparator 74 remains LO such that an AND gate 75A remains disabled.

When the second CDV signal (line c) occurs at time $t_{10}$, the A channel of the binary counter 73 reaches a count of 2. At this time the A>B output of the comparator 74 goes HI, enabling the AND gate 75A. A DGD input to the AND gate 75A is HI at this time, which allows the BDST signal to be gated through AND gate 75A to an OR gate 76B. The output of OR gate 76B is applied to an AND gate 34D and an OR gate 76C.

The other input to the AND gate 34D is the Q output of flip-flop 81A which is LO at this time. The output of AND gate 34D remains LO, which is coupled to the clock input of a counter 66. The binary output of the counter 66 is applied to multiplexers 52, 62, 72, 61, 51, 61, 71, 41, 50, 60 and 70, shown in FIG. 5c, and to a binary comparator 26. Thus, at this time, the output of the counter 66 is binary 0, which enables channel 0 of the multiplexers to be available at the data bus 780 (line 238 of FIGS. 1 and 2) to the RAM section 700 of FIG. 3.

The BDST signal (line e) is gated through the OR gate 76C to trigger the delay one-shot 56A, which provides a delay to allow the data to settle on the data bus 780. The negative edge of the signal from one-shot 56A triggers the one-shot 56B, which outputs a CTF pulse (line d) via buffer 63F to the RAM INTERFACE CONTROL circuit 740 of FIG. 3. This pulse puts the BDST signal low, and the RAM INTERFACE CONTROL circuit 740 of FIG. 3 latches the data into RAM section 700 of FIG. 3.

At time $t_{11}$, another BDST pulse (line e) occurs and is gated to the clock input of the flip-flop 80B as explained earlier. This causes the Q output of flip-flop 80B to go LO and the $\overline{Q}$ output to go HI. There is no change in the B channel input of the dual binary counter 73 since it is leading-edge triggered. The positive $\overline{Q}$ edge of flip-flop 80B latches the Q output of flip-flop 81A HI. The BDST signal is then gated through the AND gate 34D to clock the counter 66 to a count of 1. At this time, channel 1 of the multiplexers is available on the data bus 780. The CTF signal is produced which puts the BDST signal LO, as previously described, and the data value is read into the second column of the first row of the matrix. The data values continue to be transferred as described as long as the A>B output of the digital comparator 74 is HI. This ensures that the digital video count is complete before the value is read.

The number of values read during a scan is determined by the computer 713 which provides the B channel input to the binary comparator 26, as previously described. For example, assume 14 values are to be read every scan. The B channel input to the binary comparator 26 will be at a binary count of 13 (14 data values, 0 thru 13). When the counter 66 reaches a binary count of 13, the A=B output of the binary comparator 26 goes HI, which is inverted by NAND gate 82A. The output of the inverter 82 is applied to AND gates 75A and 75B as the DGD input signal. Thus, at time $t_{12}$, AND gates 75A and 75B are disabled.

The A=B output of the binary comparator 26 is also applied to the flip-flop 35A. The positive edge of the A=B output of comparator 26 causes the Q output of flip-flop 35A to go LO, disabling the AND gate 25C. The $\overline{Q}$ output of flip-flop 35A goes HI, which enables AND gate 34A. At this time, 14 data values have been read into the RAM section 700 of FIG. 3 for the first scan of the linear photodiode array 24.

The next BDST pulse will not be gated through AND gate 25C (line b of FIG. 6b) until after $\overline{SCAN}$ goes HI. At time $t_{13}$, $\overline{SCAN}$ goes HI and is gated through AND gate 34A and OR gate 46A to the input of a one-shot 65B. The output of one-shot 65B is gated through the OR gate 46B to produce the RSET signal. The RSET signal is applied to the counter 66, flip-flops 80A and 81A, and to the dual binary counter 73, initialzing them for the next scan. The RSET signal is also applied to OR gates 43A, 43B, 43C and 43D to initialze counters 22, 32, 42, 21, 31, 40, 20 and 30. The RESET signal also initialzes counter 23 and flip-flop 83A for the next scan.

The output of one-shot 65B is applied to the input of delay one-shot 45A, which provides a 2.5 microsecond delay to the input of one-shot 45B. The output of one-shot 45B is applied to the OR gate 46C which provides the DCSET output. The DCSET output is applied to AND gates 14A and 14B and to the set input of flip-flop 35A. This causes the Q output of 35A, coupled to the input of the AND gate 25C, to go HI which enables the BDST signals to be gated through the AND gate 25C at time $t_{14}$. Data values are transferred for sequential scans as previously described. When the RAM INTERFACE CONTROL circuit 740 of FIG. 3 has input the desired number of scans, the BDST signal stops and the data transfer is completed.

To ensure proper data interpertation, the data must be in order, that is, exactly 14 data values (in this example) must be transferred per scan. In the event that 14 data values are not present, the following sequence occurs. The "2" count output from the B channel of the dual binary counter 73 is applied to flip flops 80A and 35B. This signal is used to ensure that valid readouts have begun, that is, time $t_6$ has occurred as shown in FIG. 6a and digital video was present during the scan. When the "2" count output from the B channel of counter 73 goes HI, the $\overline{Q}$ output of flip-flop 35B is latched LO. This disables AND gate 34B so that the RSET and DCSET signals (lines f and g of FIG. 6b) are now controlled by the A=B output of the binary comparator 26. The "2" count output from the B channel of counter 73 also latches a HI Q output from flip-flop 80A to one input of AND gate 75C. At this time, either the A<B or the A=B output of comparator 74 is HI to the input of OR gate 76A. The output of OR gate 76A is HI to the input of AND gate 75C.

Figure 6C:
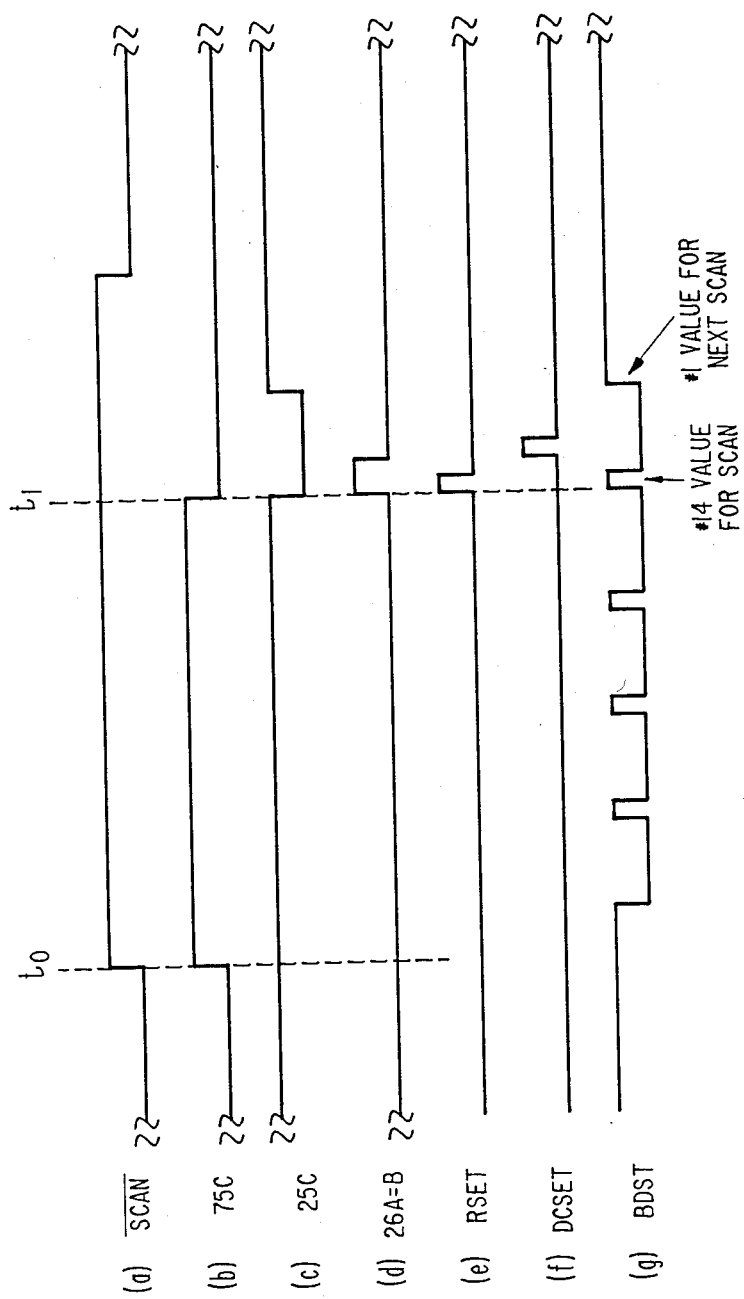

FIG. 6c shows a time scale different from that of FIG. 6a. The $\overline{SCAN}$ signal in FIG. 6a (line f) is the same as the $\overline{SCAN}$ signal in FIG. 6c (line a) with the exception that time $t_3$ to $t_6$ in FIG. 6a equates to time $t_0$ to $t_2$ in FIG. 6c. At time $t_0$ in FIG. 6c, the $\overline{SCAN}$ signal (line a) goes HI. The output of AND gate 75C (line b) goes HI, enabling AND gate 75B. The BDST pulses (line g) are gated through AND gate 75B and OR gate 76B. The data values on the data bus are then transferred as previously described. These values are either zero or a maximum value such that the control device can easily distinguish them from valid data. The BDST pulses (line g) 5g are gated through AND gate 75B until the 14th data value for the scan occurs.

When this happens, the A=B output (line d) of the binary comparator 26 goes HI at time $t_1$. This output is inverted by NAND gate 82A which goes LO, disabling AND gates 75A and 75B. The HI output of the comparator 26 clocks the Q output of the flip-flop 35A LO, and the $\overline{Q}$ output HI. This disables AND gate 25C (line c) and enables AND gate 34A. Since $\overline{SCAN}$ is HI at this time, the output of AND gate 34A goes HI and the RSET and DCSET signals (lines e and f) occur as previously described.

Figure 6D:
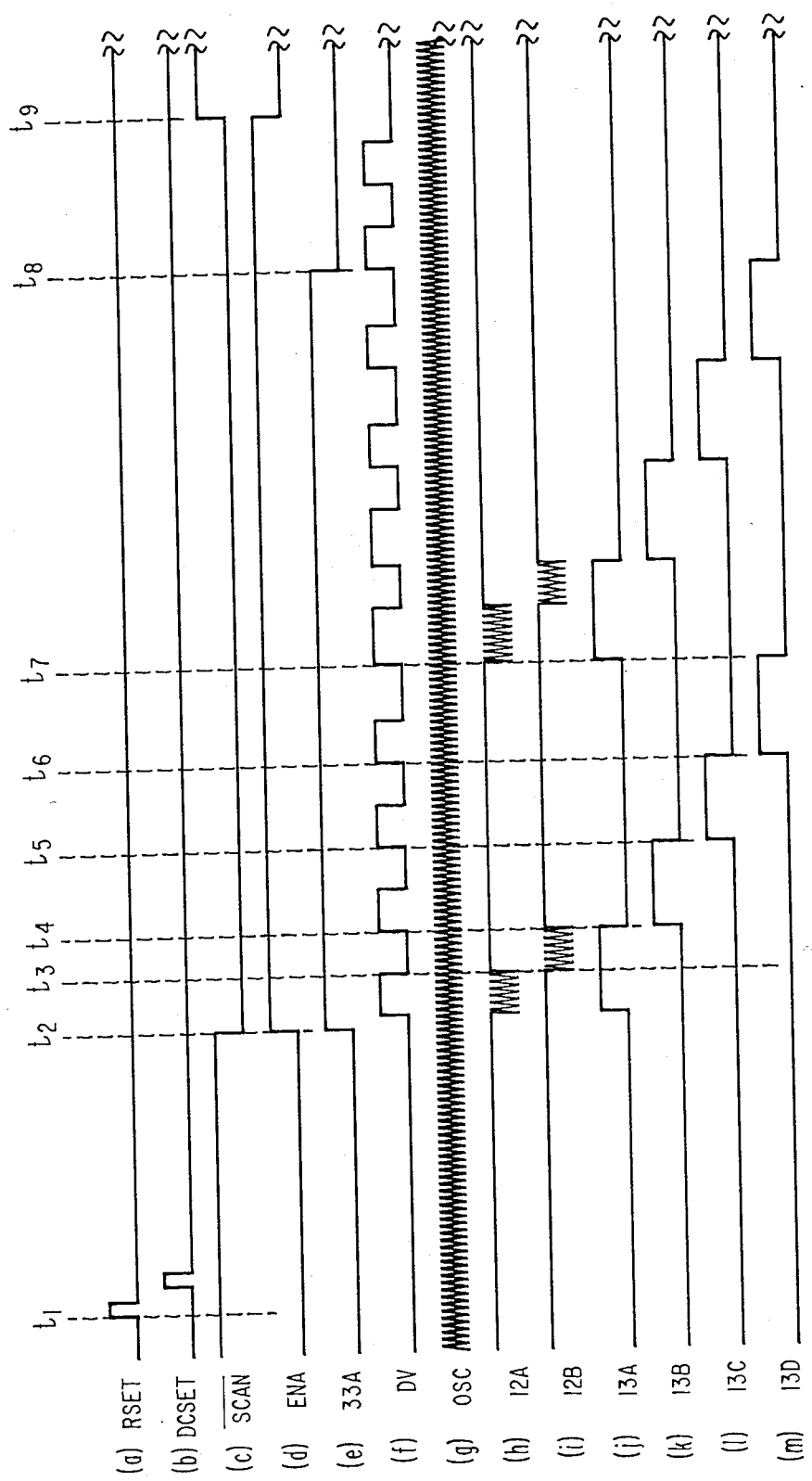

FIG. 6d shows a time scale different from that of FIG. 6a. The $\overline{SCAN}$ signal in FIG. 6a (line f) is the same as the $\overline{SCAN}$ signal in FIG. 6d (line c) with the exception that time $t_6$ to $t_7$ in FIG. 6a equates to time $t_2$ to $t_9$ in FIG. 6d. At time $t_1$ in FIG. 6d, the RSET signal (line a) initialzes decade counter 23 and flip-flop 83A, shown in FIG. 5b. The RSET signal also initializes counters 22, 32, 42, 21, 31, 40, 20 and 30 via OR gates 43A, 43B, 43C and 43D.

At time $t_2$, an output of the photodiode array 24 begins. An ENA signal (line d) goes HI at time $t_2$. The RSET signal at time $t_1$ puts the $\overline{Q}$ output of flip-flop 83A HI. Thus, the output of AND gate 33A (line e) goes HI, enabling AND gate 33B.

The DV digital video signal (line f) is delayed by a series of gates and is applied to AND gate 33B. The first positive edge of the DV signal, which is gated through AND gate 33B, clocks the A channel of binary counter 73 to a binary count of 1, via AND gate 34C, and also clocks decade counter 23. The "1" count output of counter 23 goes HI to OR gate 13A (line j). The output of OR gate 13A (line j) enables NAND gates 12A and 12B.

The delayed digital video signal is also applied to NAND gate 12A. Thus, the NAND gate 12A is gated by the OSC signal (line g) which is the pixel count. Counter 22 is a negative edge trigger and counts the number of pixels as long as the first digital video signal is HI. This represents the first data value.

When the first digital video pulse goes LO at time $t_3$, NAND gate 12A is disabled and NAND gate 12B is enabled by the inverted digital video signal from NAND gate 10C. Counter 32 counts the number of pixels for the time that the first digital video pulse is LO. This represents the second data value.

When the digital video signal goes HI at time $t_4$, the "1" count output of decade counter 23 goes LO, disabling NAND gates 12A and 12B. Counters 22 and 32 now contain a valid value for the first and second data values. The "2" count output of counter 23 goes HI, enabling NAND gates 12C and 11A via OR gate 13B. The counters 42 and 21 count the number of pixels representing the third and fourth data values in the same manner as just described. Also at time $t_4$, the A channel of the dual binary counter 73 is incremented to a count of "2" which causes the A>B output of digital comparator 74 to go HI, which allows the transfer of data in counters 22 and 32.

At time $t_5$, the DV signal (line f) increments decade counter 23, causing the "2" count output to go LO and the "3" count output to go HI. This enables NAND gates 11B and 11C so as to perform as just described. Counter 73 is incremented to a count of "3", causing the A>B output of comparator 74 to go HI, which allows the transfer of data from counters 42 and 21.

The output of OR gate 13C is also applied to OR gate 64A and AND gate 54A. The positive edge of the output from OR gate 64A triggers a one-second one-shot 36B, whose output is gated through AND gate 54A and OR gate 43A in order to reset counters 22 and 32. It should be noted that the data values have already been read out of these counters.

At time $t_6$, the decade counter 23 reaches a "4" count, and NAND gates 10A and 10B are enabled through OR gate 13D. The number of pixels representing the seventh and eighth data values are counted by counters 20 and 30 in a similar manner as previously described.

At time $t_7$, the decade counter 23 reaches a "5" count and NAND gates 12A and 12B are enabled again. Thus, a wrap around occurs in the counting circuit. That is, for the "1" or "5" count output of counter 23, counters 22 and 32 are used; for the "2" or "6" count output of counter 23, counters 42 and 21 are used; for the "3" or "7" count output of counter 23, counters 31 and 40 are used; and for the "4" or "8" count output of counter 23, counters 20 and 30 are used. Thus, a total of 16 data values can be obtained per scan.

The outputs of OR gates 13A, 13B, 13C and 13D are also applied to OR gate 64A and also to AND gates 54C, 54D, 54A and 54B, respectively. The outputs of AND gates 54A, 54B, 54C and 54D are applied to OR gates 43A, 43B, 43C and 43D, respectively. The outputs of OR gates 43A, 43B, 43C and 43D are applied, respectively, to the reset inputs of counters 22 and 32, 42 and 21, 31 and 40, and 20 and 30. Thus, each pair of counters is reset to zero after the data has been read out, and the counters are ready to count the number of pixels for a new pair of data values.

At time $t_8$, the CO output of the decade counter 23 goes HI, latching the $\overline{Q}$ output of flip-flop 83A LO, which disables AND gate 33A. This prevents the decade counter 23 from beginning a new count for one scan of the photodiode array 24. The RSET pulse occurs as previously described, and the process continues for the next scan until the desired number of scans have been completed.

The binary outputs of counters 22, 32, 42, 21, 31, 40, 20 and 30 are applied to multiplexers 52, 62, 72, 51, 61, 71, 41, 50, 60 and 70, whose outputs are applied, respectively, to buffers 53A, 53B, 53C, 53D, 53E, 53F, 63A, 63B, 63C and 63D to provide a 10-bit binary output to the data bus 238 as outputs BT$\phi$ through BT7. The outputs of the counter 66 are applied to the address inputs of the multiplexers 52, 62, 72, 51, 61, 71, 41, 50, 60 and 70 such that the data values from the pixel counters are output to the data bus 238 at the proper time, as explained previously.

Figure 7A:
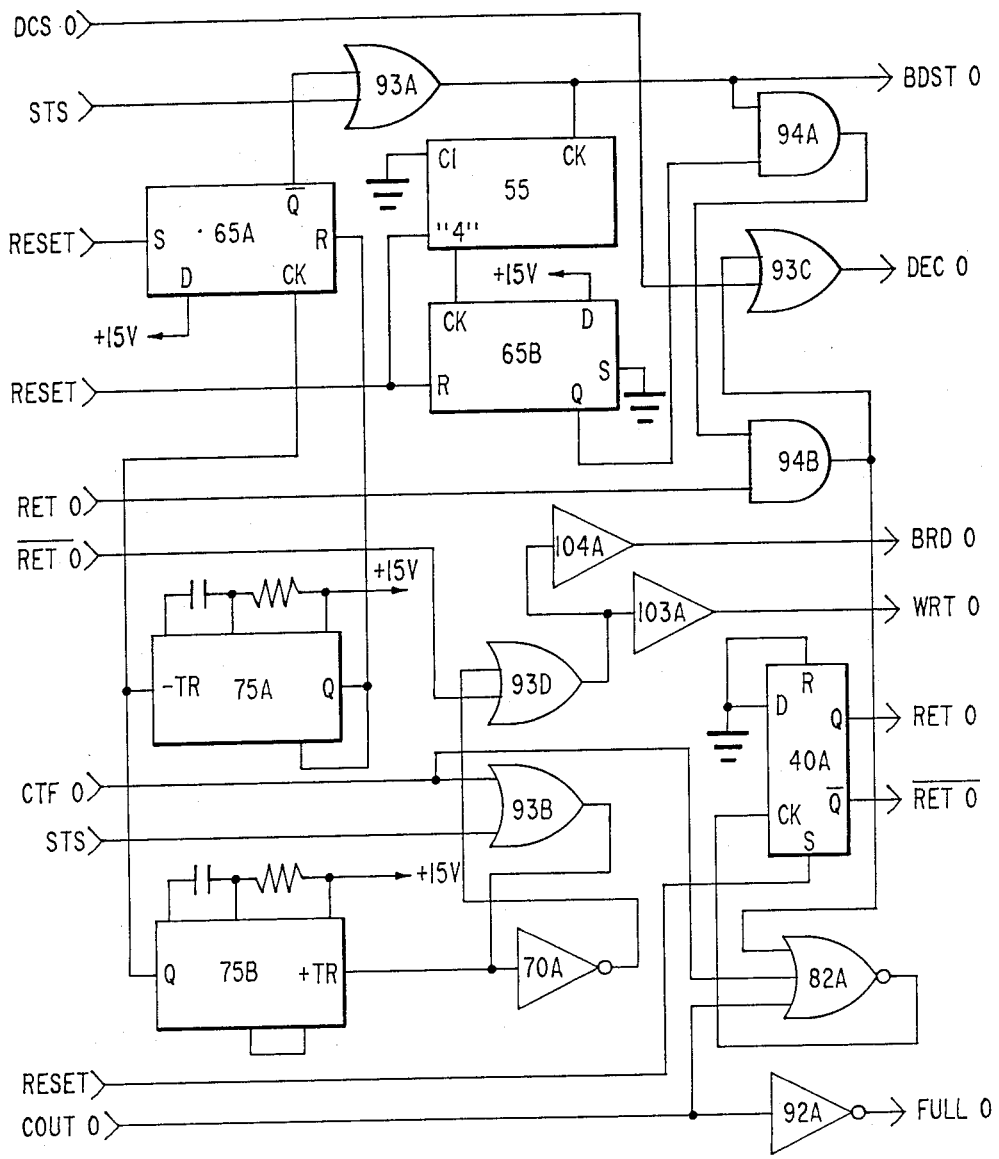
FIGS. 7a and 7b are schematic diagrams showing a RAM INTERFACE CONTROL circuit which can be used in the system shown in FIG. 3.
Figure 7B:
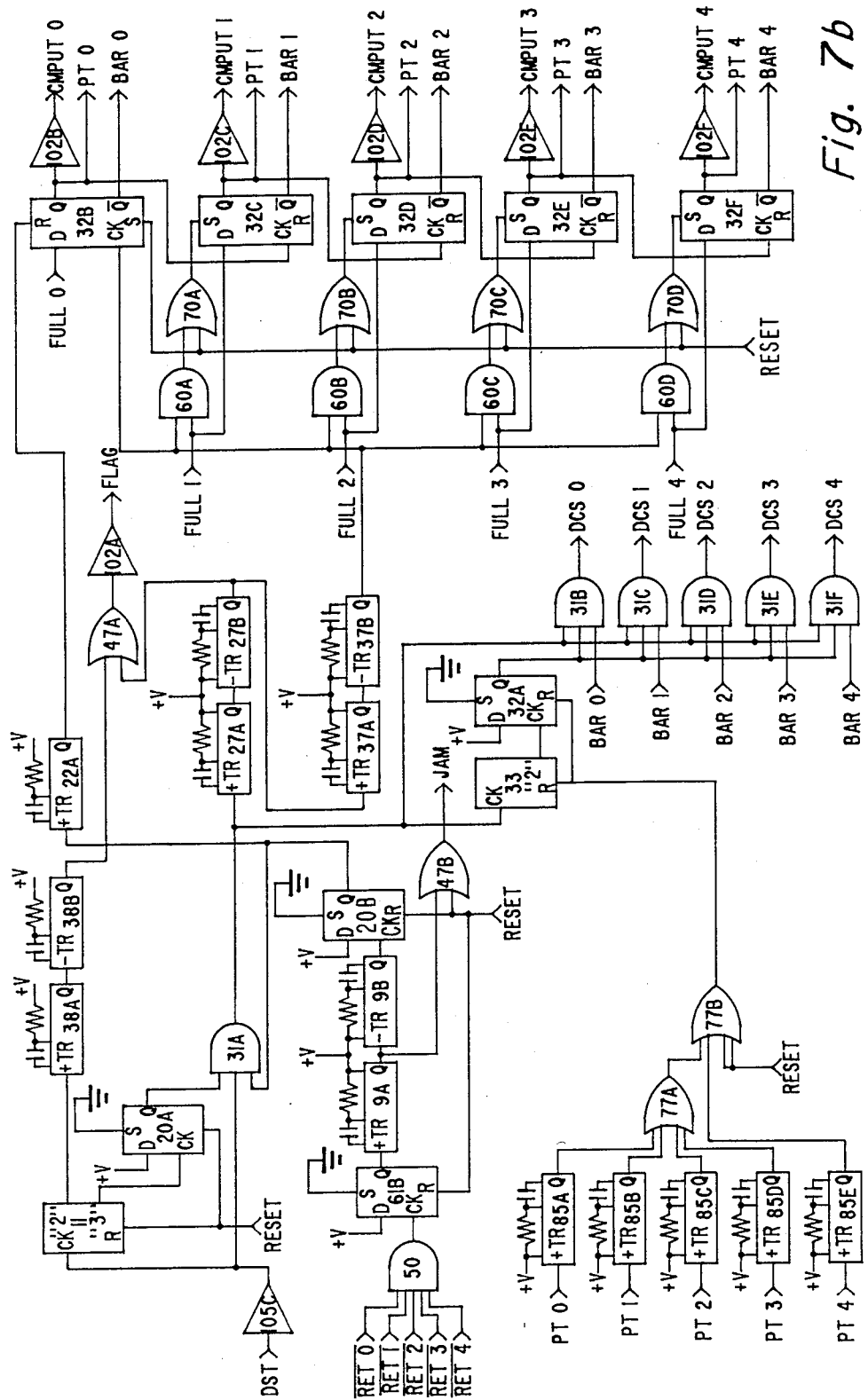
Figures 8A, 8B:
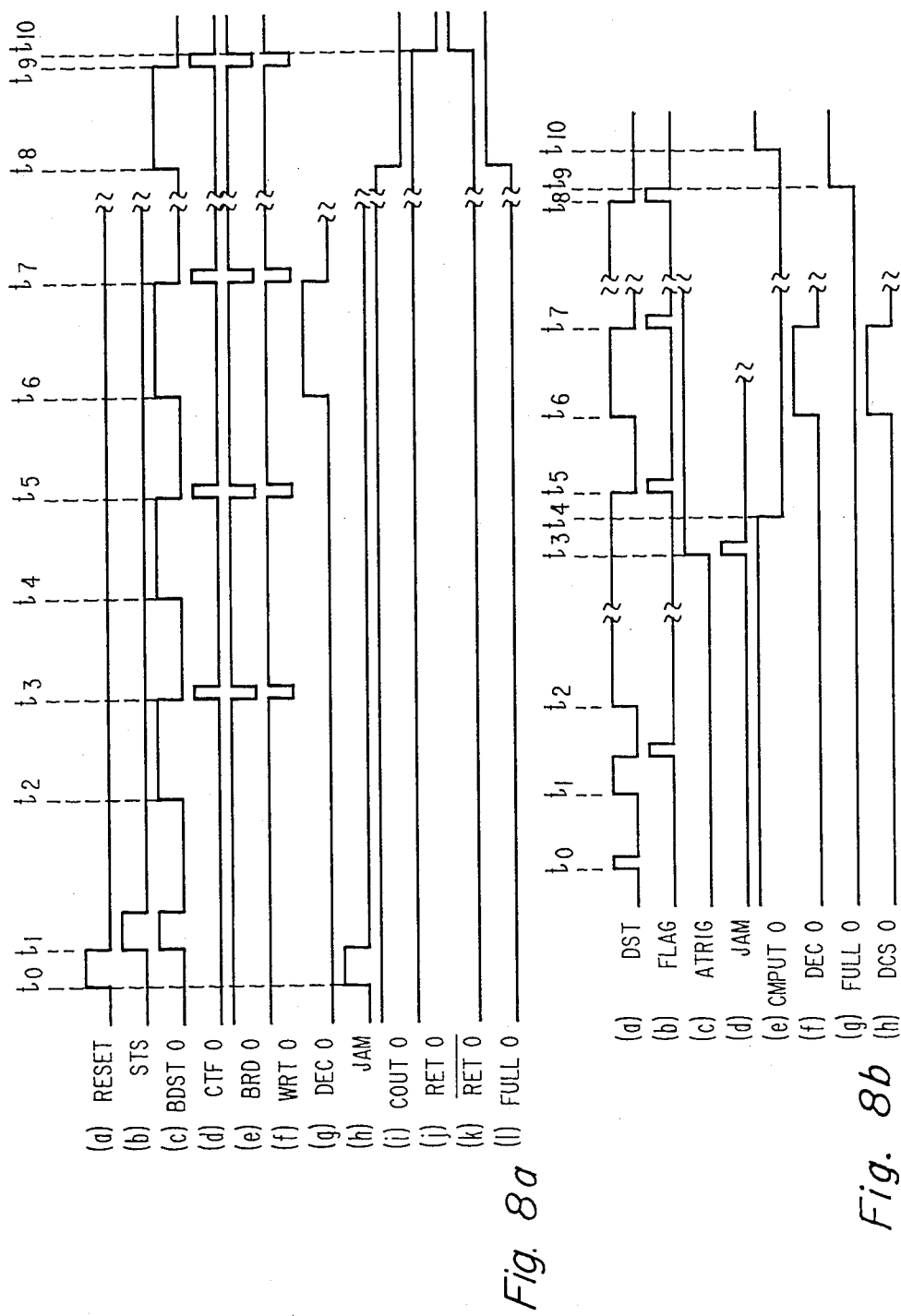
FIGS. 8a and 8b are time sequence graphs showing a logic sequence for various signals transmitted by the RAM INTERFACE CONTROL circuit of FIGS. 7a and 7b.

FIGS. 7a and 7b are schematic diagrams showing the RAM INTERFACE CONTROL circuit 740 of FIG. 3. There are five identical circuits within the RAM INTERFACE CONTROL circuit 740 which interface with the five RETICON INTERFACE circuits 33 of FIG. 2. One of these interface circuits is shown in FIG. 7a. A schematic diagram of the circuitry that interfaces the RAM section 700 of FIG. 3 to the computer interface system 716 of FIG. 3 is shown in FIG. 7b. FIGS. 8a and 8b show the time sequence graphs for various signals utilized in the RAM INTERFACE CONTROL circuit 740.

At time $t_0$ in FIG. 8a, the RESET pulse (line a) goes HI from the SETUP and CONTROL circuit 718 of FIG. 3. The RESET pulse (line a) initializes flip-flops 40A, 65A and 65B, and binary counter 55 of FIG. 7a. At time $t_1$, an STS pulse (line b) occurs which is gated through OR gate 93A, producing a BDST$\phi$ signal pulse (line c) to address RETICON INTERFACE circuit 33 of FIG. 2. The STS pulse (line b) is also gated through OR gate 93B, which triggers a one-shot 75B. The output of the one-shot 75B is applied to the clock input of flip-flop 65A, but it has no effect since flip-flop 65A is initially set by the RESET pulse (line a). The negative edge of the output from one-shot 75B triggers one-shot 75A which resets flip-flop 65A, causing the $\overline{Q}$ output of flip-flop 65A to go HI, thereby producing another BDST$\phi$ signal pulse (line c) through OR gate 93A at time $t_2$. This BDST$\phi$ signal pulse (line c) at time $t_2$ tells the RETICON INTERFACE circuit 33 that the RAM MEMORY circuit 721 is ready to receive data. The RETICON INTERFACE circuit 33 answers with a CTF$\phi$ signal pulse (line d) at time $t_3$. The positive edge of this CTF$\phi$ signal pulse is gated through OR gate 93B and causes the one-shot 75B to trigger, which in turn causes the $\overline{Q}$ output of flip-flop 65A to go LO to the input of OR gate 93A, thereby putting the BDST$\phi$ signal (line c) LO. The negative edge of the output from one-shot 75B triggers one-shot 75A which resets flip-flop 65A, causing the BDST$\phi$ signal (line c) to go HI at time $t_4$. The BDST$\phi$ signal remains HI until it receives a CTF$\phi$ signal from the RETICON INTERFACE circuit 33. When the RETICON INTERFACE circuit 33 is ready with the first data value to be stored in RAM MEMORY circuit 721, the CTF$\phi$ signal goes HI.

At time $t_5$, a second CTF$\phi$ signal pulse occurs, putting the BDST$\phi$ signal LO, as previously described. This CTF$\phi$ signal pulse is gated through OR gate 93B to inverter 70A, whose output is gated through OR gate 93D. The output of OR gate 93D is gated through buffers 104A and 103A to produce a BRD$\phi$ signal (line e) and a WRT$\phi$ signal (line f). These signals are applied to the RAM MEMORY circuit 721, causing the RAM section 700 thereof (at RAM address 2799) to read the data from the RETICON INTERFACE circuit 33.

At time $t_6$, the negative edge of the output from one-shot 75B goes LO and triggers one-shot 75A which resets flip-flop 65A, causing the BDST$\phi$ signal to go HI. The output of OR gate 93A clocks the "4" count output of binary counter 55 HI, which latches the Q output of flip-flop 65B HI which, in turn, enables AND gate 94A. The BDST$\phi$ signal is now also gated through AND gate 94B, producing a DEC$\phi$ signal (line g) out of OR gate 93C. This signal is applied to the RAM MEMORY circuit 721, causing the RAM section 700 address to be decremented.

At time $t_7$, another CTF$\phi$ signal pulse (line d) occurs, causing the BRD$\phi$ signal (line e) and the WRT$\phi$ signal (line f) to go LO and, thereby, allowing data to be read into the next decremented location of the RAM section 700 (RAM address 2798). This process continues until the RAM section 700 address $\phi$ is reached at time $t_8$. At this time, a COUT$\phi$ signal (line i) from the RAM MEMORY circuit 721 goes LO to the input of NOR gate 82A and inverter 92A. The output of inverter 92A is a FULL$\phi$ signal which is applied to a flip-flop 32B (shown in FIG. 7b) as described later. At time $t_9$, another CTF$\phi$ signal pulse occurs which causes the data to be read into RAM section 700 location $\phi$. At time $t_{10}$, the data has been read into RAM section 700 location $\phi$, and the CTF$\phi$ signal goes LO. At this time, all inputs to NOR gate 82A are LO, causing the NOR gate 82A output to go HI, and latch flip-flop 40A.

The Q output of flip-flop 40a is a RET$\phi$ signal (line j) which goes LO which disables AND gate 94B, thereby preventing the RAM section 700 address counter from being addressed via AND gate 94B. The $\overline{Q}$ output of flip-flop 40A is $\overline{RET\phi}$ signal (line k) which goes HI and causes the BRD$\phi$ signal (line e) and the WRT$\phi$ signal (line f) to go HI. These signals remove the data bus 238 of the RETICON INTERFACE circuit of FIG. 2 from the RAM MEMORY circuit 721 and put the RAM MEMORY circuit 721 in a read-only mode.

FIG. 7b shows a schematic diagram of a second portion of the RAM INTERFACE CONTROL circuit 740 of FIG. 3. This portion of the RAM INTERFACE CONTROL circuit 740 interfaces the RAM section 700 of FIG. 3 to the computer interface system 716 of FIG. 3, for transfer of data from RAM section 700. This portion of the RAM INTERFACE CONTROL circuit 740 is explained below in conjunction with FIG. 8b, and is similar for the remaining RAM sections 701, 702, 703 and 704. FIG. 8b shows a time scale different from that of FIG. 8a.

When the data values from all five RETICON INTERFACE circuits 33 have been read into the RAM MEMORY circuit 721, all the $\overline{RET}$ ($\phi$, 1, 2, 3 and 4) signal inputs to AND gate 50 (shown in FIG. 7b) are HI, thereby latching flip-flop 61B HI and causing its Q output, an ATRIG signal (line c in FIG. 8b), to go HI. While the data values were being read into the RAM MEMORY circuit 721, the computer DST signal on line 768 is applied to buffer 105C at time $t_0$. The output of buffer 105C is applied to the clock input of decade counter 11. The "2" count output of the decade counter 11 remains LO, thus this first DST signal (line a in FIG. 8b) has no affect on the circuit. This first DST signal is simply an address to the circuit.

At time $t_1$, the DST signal (line a) from the computer 713 goes HI again, which causes the "2" count output of decade counter 11 to go HI, triggering one shots 38A and 38B to produce a FLAG signal (line b), via OR gate 45A and buffer 102A, on line 769 of FIG. 3.

At time $t_2$, the DST signal again goes HI, waiting for the first data value. This DST pulse causes the "3" count output of counter 11 to go HI, latching the Q output of flip-flop 20A HI to the input of AND gate 31A. The Q output of flip-flop 20B is LO at this time to AND gate 31A and, thus, the DST signal pulses are prevented from being gated through AND gate 31A. The DST signal stays HI, waiting for a FLAG signal from the RAM INTERFACE CONTROL circuit 740.

At time $t_3$, the ATRIG signal (line c) goes HI and causes one-shot 9A to go HI, sending a JAM signal (line d) via OR gate 47B, to the RAM MEMORY cirucit 721. The JAM signal sets the address of the RAM MEMORY circuit 721 back to the original address that existed when the data was previously read into the RAM MEMORY circuit 721.

At time $t_4$, the negative edge of one-shot 9A triggers one-shot 9B which latches flip-flop 20B HI, enabling AND gate 31A and causing one-shot 22A to go HI, thereby resetting flip-flop 32B. This causes the Q output of flip-flop 32B to go LO and the $\overline{Q}$ output of flip-flop 32B to go HI. The Q output of flip-flop 32B is applied to buffer 102B which produces a CMPUT$\phi$ signal to the RAM MEMORY circuit 721. This CMPUT$\phi$ signal puts the data values from the initial RAM location of RAM section 700 (FIG. 3) on the computer data bus 767 of FIG. 3.

The HI $\overline{Q}$ output of flip-flop 32B is a BAR$\phi$ signal which is applied to AND gate 31B. The other inputs to AND gate 31B are the DST signal (line a) gated through AND gate 31A, and the Q output of flip-flop 32A. At this time $t_4$, the Q output of 32A is LO, disabling AND gate 31B.

At time $t_5$, the output of one-shot 27B goes HI through OR gage 47A, sending the FLAG signal (line b) from buffer 102A. This causes the DST signal (line a) to go LO, and the computer 713 reads the data values from the initial RAM location of RAM section 700 (FIG. 3).

At time $t_6$, another DST signal is generated which causes the "2" count output of decade counter 33 to go HI, thereby latching the Q output of flip-flop 32A HI. The DST signal (line a) is now gated through AND gate 31B and sends the DCS$\phi$ signal (line h) to the input of OR gate 93C of FIG. 7a, thereby producing the DEC$\phi$ signal (line f) which decrements the RAM section 700 address.

Data values are continuously read from the RAM section 700 into the computer 713. At time $t_8$, the FLAG signal (line b) is generated, causing the data to be read from RAM location $\phi$ of RAM section 700 (FIG. 3). At time $t_9$, the FULL$\phi$ signal (line g) goes HI to the D input of flip-flop 32B. The output of one-shot 27B is also applied to a one-shot 37A whose negative pulse triggers one-shot 37B. A short time after the FLAG signal occurs, the output of 37B goes HI at time $t_{10}$. This causes the Q output of flip-flop 32B to go HI, which removes RAM section 700 of FIG. 3 from the computer data bus 767. Data values are then read out of the remaining RAM sections 701, 702, 703 and 704 in a similar manner, as described above.

Figure 9:
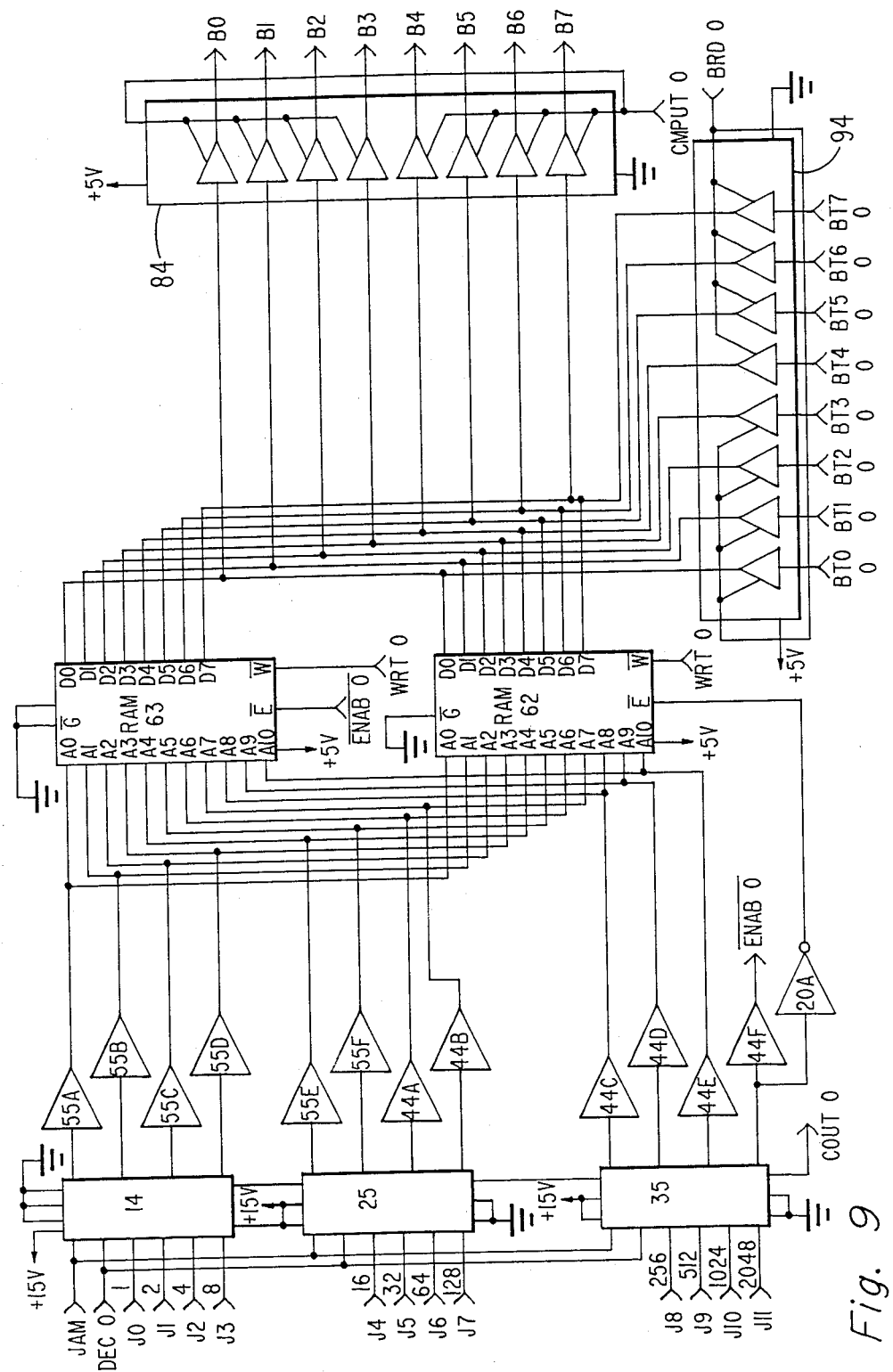
FIG. 9 is a schematic diagram of a RAM MEMORY circuit which can be used in the system shown in FIG. 3.

FIG. 9 is a schematic diagram showing one of the sections 700 through 704 of RAM MEMORY circuit 721 (FIG. 3). IC's 14, 25 and 35 are countdown counters whose inputs J$\phi$ through J11 are received from the SETUP AND CONTROL circuit 718 of FIG. 3. These inputs establish the starting address at which data values are read into each RAM section from the RETICON INTERFACE circuit 33 and also read out of each RAM section to the computer 713 via the computer interface system 716 of FIG. 3.

The outputs of the countdown counters 14, 25 and 35 are buffered to provide a matching interface to the address inputs of RAM IC's 63 and 62. When the JAM input to counters 14, 25 and 35 go HI, the counter outputs are set to an address as dictated by the J$\phi$ through J11 inputs. Each time the DEC$\phi$ signal goes HI, the counters 14, 25 and 35 are decremented, which in turn decrements the RAM section address. When all the counters reach the $\phi$ address, a COUT$\phi$ signal from counter 35 is applied to the RAM INTERFACE CONTROL circuit (FIG. 7a), as previously described.

During the time data is being read into RAM section 700, the CMPUT$\phi$ signal (from FIG. 7b) is HI, putting an output multiplexer circuit 84 to the high impedance state. The data from the RETICON INTERFACE circuit 33 is applied as inputs BT$\phi$ through BT7 to an input multiplexer circuit 94. When data is being written into the RAM section 700, the WRT$\phi$ and BRD$\phi$ signals go LO, which causes the inputs BT$\phi$ through BT7 to be written into the RAM section 700.

When data is read from the RAM section 700 to the computer 713, both the WRT$\phi$ and BRD$\phi$ signals are HI. This causes the RAM section 700 to be in the read mode, and also puts the input multiplexer circuit 94 to the high impedance state. The outputs of the RAM section 700 are applied to the computer interface system 716 when the CMPUT$\phi$ signal is LO, which enables the output multiplexer circuit 84. The outputs of multiplexer circuit 84, B$\phi$ through B7, are connected to the computer data bus 767.

What is claimed is:

1. A RAM (Random Access Memory) interface control circuit used for measuring spaces in a periodic matrix by controlling a RAM memory circuit coupled between a photodetector array interface circuit and a computer comprising:

first logic means for producing a data strobe (BDST) signal for transmission to said photodetector array interface circuit, said first logic means having the output thereof connected to a first output terminal and the input thereof connected to a first input terminal for receiving a CTF signal from said photodetector array interface circuit;

second logic means having the input thereof connected to said first output terminal, the output of said second logic means being connected to one input of a first OR gate for producing a DEC signal for transmission to said RAM memory circuit;

a NOR gate having three inputs connected, respectively, to the output of said second logic means, said first input terminal, and a second input terminal for receiving a COUT signal from said RAM memory circuit;

a first flip-flop having the clock input thereof connected to the output of said NOR gate, the Q output thereof coupled to said second logic means, and the $\overline{Q}$ output thereof coupled to said first logic means;

a second flip-flop having the D input thereof coupled to said second input terminal, the Q output thereof producing a CMPUT signal for transmission to said RAM memory circuit;

a first AND gate having the output thereof connected to the other input of said first OR gate, said first AND gate having three inputs, the first input thereof being connected to the $\overline{Q}$ output of said second flip-flop;

a second AND gate having the output thereof coupled to the second and third inputs of said first AND gate, said second AND gate having three inputs, two inputs of said second AND gate being coupled to a third input terminal for receiving a DST signal from said computer;

third logic means having the input thereof connected to the output of said second AND gate, the output of said third logic means being coupled to the clock input of said second flip-flop;

fourth logic means having the input thereof connected to the $\overline{Q}$ output of said first flip-flop, the output of said fourth logic means being coupled to both the first input of said second AND gate and the reset input of said second flip-flop; and a second OR gate having one input thereof coupled to said third input terminal for producing a FLAG signal for transmission to said computer, the other input of said second OR gate being coupled to said third logic means.

2. A RAM interface control circuit as defined in claim 1, wherein said first logic means comprises:

a third OR gate having one input thereof connected to said first input terminal;

a first one-shot having an input of one type polarity connected to the output of said third OR gate;

a second one-shot having an input of the opposite type polarity connected to the output of said first one-shot; and a third flip-flop having the clock input thereof connected to the output of said first one-shot, the reset input thereof connected to the output of said second one-shot, and the $\overline{Q}$ output thereof coupled to said first output terminal.

3. A RAM interface control circuit as defined in claim 2, wherein said first logic means further comprises a fourth OR gate having one input thereof coupled to the output of said third OR gate for producing BRD and WRT signals for transmission to said RAM memory circuit, the other input of said fourth OR gate being connected to the $\overline{Q}$ output of said first flip-flop.

4. A RAM interface control circuit as defined in claim 3, wherein said third OR gate is coupled to said fourth OR gate by having the output of said third OR gate connected to the input of a first inverter, the output of said first inverter being connected to the one input of said fourth OR gate.

5. A RAM interface control circuit as defined in claim 2, wherein the $\overline{Q}$ output of said third flip-flop is coupled to said first output terminal by having the $\overline{Q}$ output thereof connected to one input of a fifth OR gate, the output of said fifth OR gate being connected to said first output terminal.

6. A RAM interface control circuit as defined in claim 1, wherein said second logic means comprises:

a third AND gate having the inputs thereof coupled to said first output terminal; and a fourth AND gate having one input thereof connected to the output of said third AND gate and the other input thereof connected to the Q output of said first flip-flop, the output of said fourth AND gate being connected to both the one input of said first OR gate and an input of said NOR gate.

7. A RAM interface control circuit as defined in claim 5, wherein said third AND gate is coupled to said first output terminal by having one input thereof connected to said first output terminal and the other input thereof connected to the output of a first binary counting means, the input of said first binary counting means being connected to said first output terminal.

8. A RAM interface control circuit as defined in claim 7, wherein said first binary counting means comprises:

a first binary counter having the clock input thereof connected to said first output terminal; and a fourth flip-flop having the clock input thereof connected to the "4" count output of said first binary counter, and the Q output thereof connected to the other input of said third AND gate.

9. A RAM interface control circuit as defined in claim 1, wherein said second AND gate is coupled to said first AND gate by having the output of said second AND gate connected to both the second input of said first AND gate and the input of a second binary counting means, the output of said second binary counting means being connected to the third input of said first AND gate.

10. A RAM interface control circuit as defined in claim 9, wherein said second binary counting means comprises:

a second binary counter having the clock input thereof connected to the output of said second AND gate; and a fifth flip-flop having the clock input thereof connected to the "2" count output of said second binary counter, and the Q output thereof connected to the third input of said first AND gate.

11. A RAM interface control circuit as defined in claim 10, wherein the reset inputs of said second binary counter and said fifth flip-flop are coupled to the Q output of said second flip-flop.

12. A RAM interface control circuit as defined in claim 1, wherein said second AND gate is coupled to said third input terminal by having a second input thereof connected to said third input terminal and a third input thereof connected to the output of a third binary counting means, the input of said third binary counting means being connected to said third input terminal.

13. A RAM interface control circuit as defined in claim 12, wherein said third binary counting means comprises:

a third binary counter having the clock input thereof connected to said third input terminal; and a sixth flip-flop having the clock input thereof connected to the "3" count output of said third binary counter, and the Q output thereof connected to the third input of said second AND gate.

14. A RAM interface control circuit as defined in claim 13, wherein said second OR gate is coupled to said third input terminal by having the "2" count output of said third binary counter connected to the input of a third one-shot having one type polarity, the output of said third one-shot being connected to the input of a fourth one-shot of the opposite type polarity, the output of said fourth one-shot being connected to the one input of said second OR gate.

15. A RAM interface control circuit as defined in claim 1, wherein said third logic means comprises:

a fifth one-shot having an input of one type polarity connected to the output of said second AND gate;

a sixth one-shot having an input of the opposite type polarity connected to the output of said fifth one-shot;

a seventh one-shot having an input of one type polarity connected to the output of said sixth one-shot; and an eighth one-shot having an input of the opposite type polarity connected to the output of said seventh one-shot, the output of said eighth one-shot being connected to the clock input of said second flip-flop.

16. A RAM interface control circuit as defined in claim 15, wherein said second OR gate is coupled to said third logic means by having the output of said seventh one-shot connected to the other input of said second OR gate.

17. A RAM interface control circuit as defined in claim 1, wherein said fourth logic means comprises:
   a fifth AND gate having one input thereof connected to the $\overline{Q}$ output of said first flip-flop;
   a seventh flip-flop having the clock input thereof connected to the output of said fifth AND gate;
   a ninth one-shot having an input of one type polarity connected to the Q output of said seventh flip-flop;
   a tenth one-shot having an input of the opposite type polarity connected to the output of said ninth one-shot; and
   an eighth flip-flop having the clock input thereof connected to the output of said tenth one-shot, the Q output of said eighth flip-flop being connected to the first input of said second AND gate.

18. A RAM interface control circuit as defined in claim 17, wherein said fourth logic means further comprises a sixth OR gate having one input thereof connected to the output of said ninth one-shot for producing a JAM signal for transmission to said RAM memory circuit.

19. A RAM interface control circuit as defined in claim 17, wherein said fourth logic means is coupled to the reset input of said second flip-flop by having the Q output of said eighth flip-flop connected to the input of an eleventh one-shot, the output of said eleventh one-shot being connected to the reset input of said second flip-flop.

20. A RAM interface control circuit as defined in claim 1, wherein said second input terminal is coupled to the D input of said second flip-flop by having said second input terminal connected to the input of a second inverter, the output of said second inverter being connected to the D input of said second flip-flop.

* * * * *